United States Patent
Muramoto et al.

(10) Patent No.: US 6,507,359 B1
(45) Date of Patent: Jan. 14, 2003

(54) IMAGE DISPLAY SYSTEM

(75) Inventors: Tomotaka Muramoto, Yokohama (JP);
Jun Tokumitsu, Sagamihara (JP);
Tsunefumi Tanaka, Yokohama (JP);
Hiroaki Hoshi, Yokohama (JP);
Shigeki Okauchi, Kodaira (JP); Nobuo Fukushima, Yokohama (JP); Katsumi Iijima, Hachioji (JP); Atsushi Namba, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/805,032

(22) Filed: Feb. 21, 1997

Related U.S. Application Data

(63) Continuation of application No. 08/308,645, filed on Sep. 19, 1994.

(30) Foreign Application Priority Data

Sep. 20, 1993 (JP) .............................................. 5-232883
Apr. 22, 1994 (JP) .............................................. 6-084671
Apr. 22, 1994 (JP) .............................................. 6-084672

(51) Int. Cl.$^7$ ................................................. H04N 7/18
(52) U.S. Cl. ............................. 348/47; 348/42; 348/51; 345/8
(58) Field of Search ........................ 348/42, 44, 36, 348/47, 51, 52, 54; 345/6, 8, 419, 757; 359/462, 466, 472, 477

(56) References Cited

U.S. PATENT DOCUMENTS

| | | | |
|---|---|---|---|
| 3,959,580 A | * 5/1976 | Chocol et al. ............... 178/6.5 |
| 4,087,167 A | * 5/1978 | Albrecht ..................... 353/116 |
| 4,559,555 A | 12/1985 | Schoolman .................. 348/42 |
| 4,636,866 A | * 1/1987 | Hattori ........................... 345/8 |
| 4,723,159 A | * 2/1988 | Imsand ......................... 348/42 |
| 4,734,756 A | * 3/1988 | Butterfield et al. ........... 348/42 |
| 4,818,858 A | * 4/1989 | Sorimachi et al. ............ 348/42 |
| 4,819,064 A | * 4/1989 | Diner ........................... 348/42 |
| 4,853,764 A | * 8/1989 | Sutter ........................... 348/53 |
| 4,956,705 A | * 9/1990 | Wright .......................... 348/48 |
| 4,959,641 A | * 9/1990 | Bass et al. ................... 340/700 |
| 4,984,179 A | * 1/1991 | Waldern ....................... 348/54 |
| 5,003,300 A | * 3/1991 | Wells .......................... 340/980 |
| 5,073,914 A | 12/1991 | Asahina et al. ............... 378/42 |
| 5,129,716 A | * 7/1992 | Holakovszky et al. ........ 348/53 |
| 5,142,357 A | * 8/1992 | Lipton et al. ................. 348/48 |
| 5,142,642 A | * 8/1992 | Sudo ............................ 348/47 |
| 5,175,616 A | * 12/1992 | Milgram et al. .............. 348/42 |
| 5,325,386 A | * 6/1994 | Jewell et al. ................ 359/214 |
| 5,337,096 A | * 8/1994 | Qu et al. ........................ 353/7 |
| 5,347,400 A | * 9/1994 | Hunter ........................... 345/7 |
| 5,359,675 A | * 10/1994 | Siwoff ............................ 345/8 |
| 5,587,836 A | * 12/1996 | Takahashi et al. .......... 359/630 |
| 5,596,433 A | * 1/1997 | Konuma ..................... 359/630 |

\* cited by examiner

*Primary Examiner*—Vu Le
(74) *Attorney, Agent, or Firm*—Morgan & Finnegan, L.L.P.

(57) ABSTRACT

Convergence angle information and image information of video cameras is transmitted from a multi-eye image-taking apparatus having two video cameras through a recording medium to a displaying apparatus. A convergence angle of display units in the displaying apparatus is controlled in accordance with the convergence angle information of the video cameras, permitting an observer to observe natural images. Since the convergence angle information is made ahead of the image information, the convergence angle of the display units can be changed with a natural feeling.

16 Claims, 24 Drawing Sheets

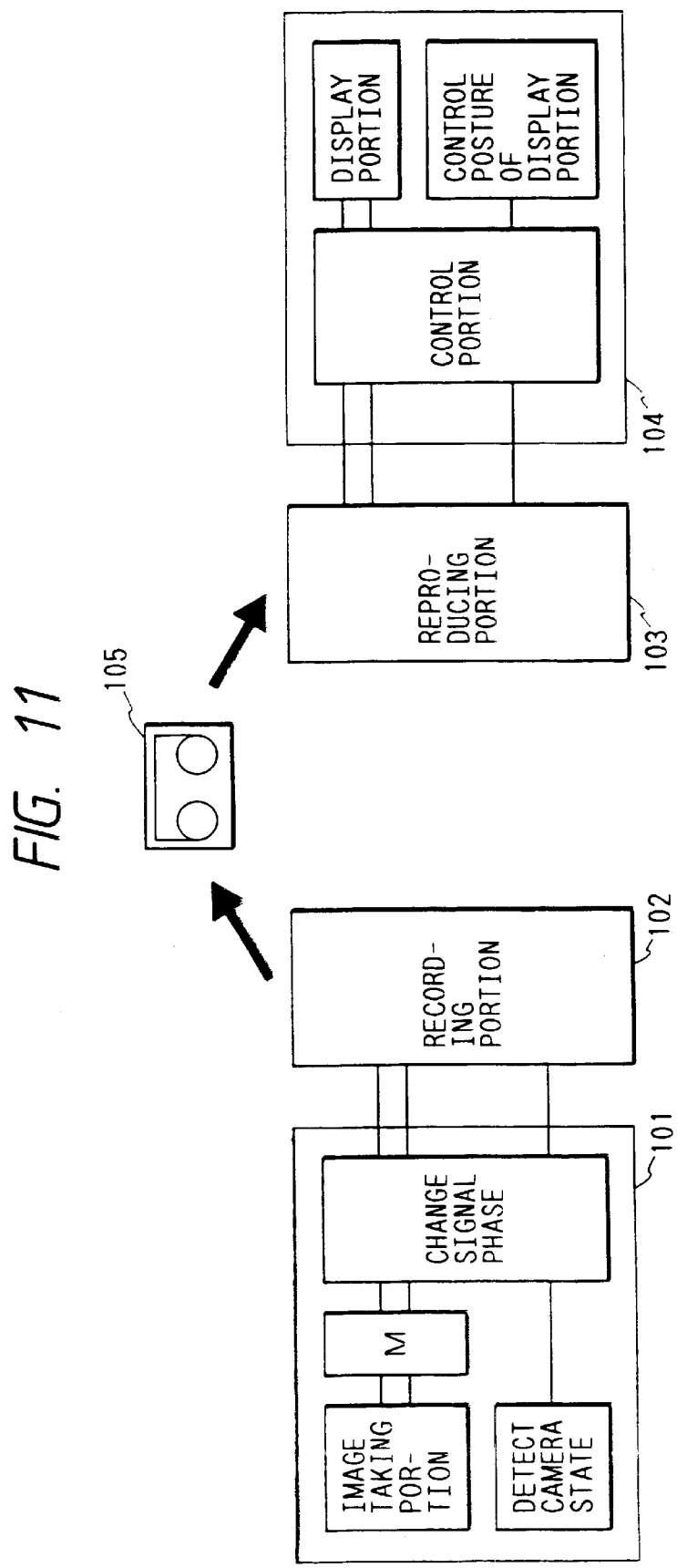

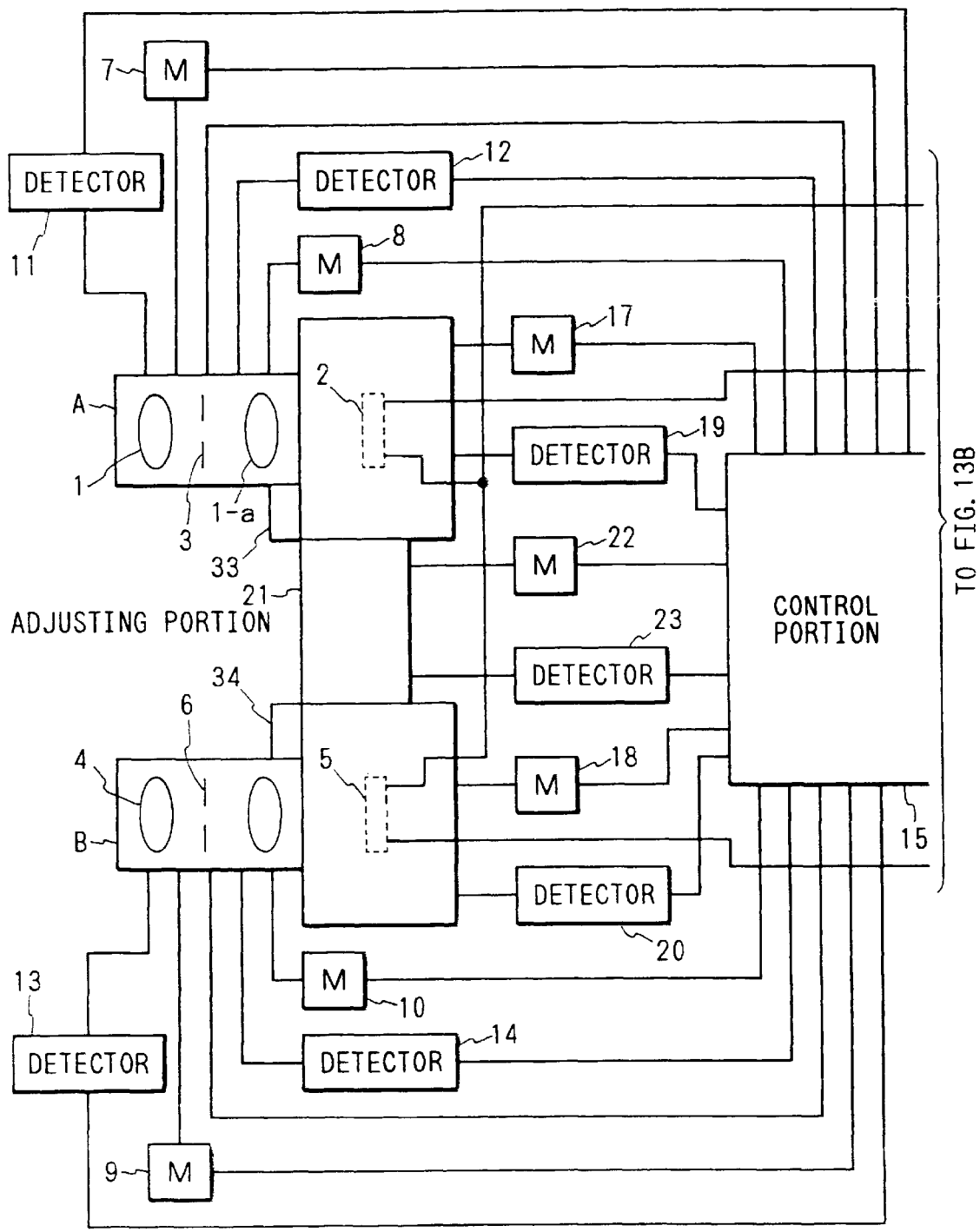

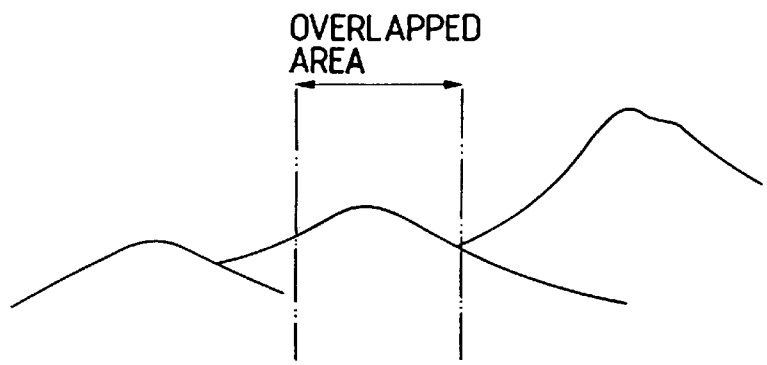
FIG. 15
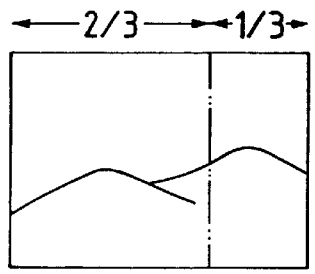
IMAGE BY
LEFT CAMERA
FIG. 15A
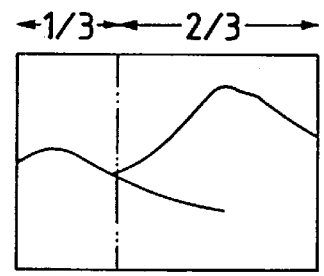
IMAGE BY
RIGHT CAMERA
FIG. 15B

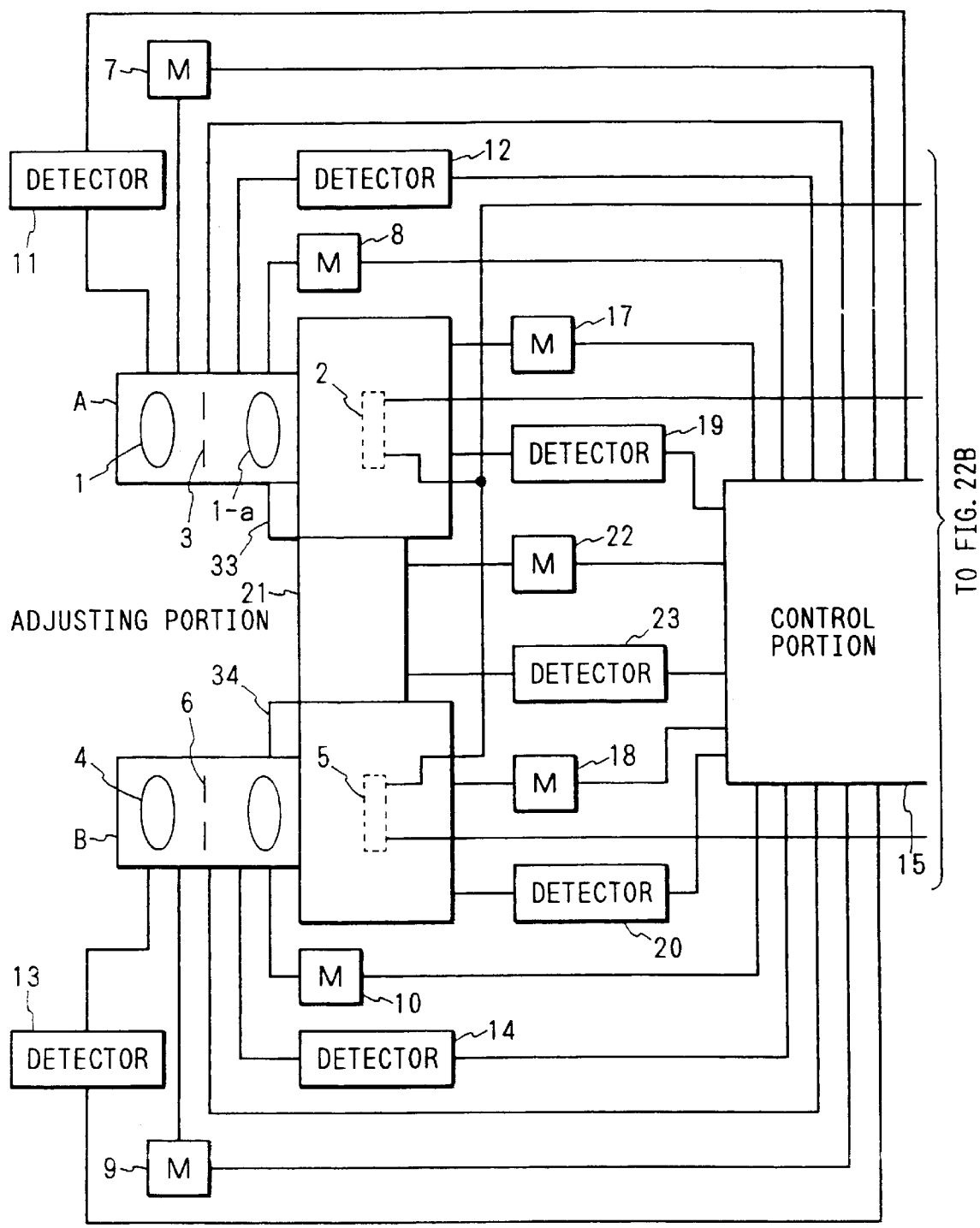

IMAGE DISPLAY SYSTEM

This is a continuation of application Ser. No. 08/308,645, filed on Sep. 19 1994.

BACKGROUND OF THE INVENTION

1. Field of the Invention

The present invention relates to an image taking and/or displaying system which can take and/or display a stereoscopic image or a wide image. More particularly, the invention relates to an image taking and/or displaying system provided with a multi-eye camera apparatus having a plurality of camera units and a displaying device which can permit an observer to observe an enlarged screen of virtual images of taken images through a compact display unit mounted on the observer's head.

2. Related Background Art

Recently used to obtain camera images close to the human vision are stereoscopic image taking apparatus which can obtain camera images by taking images of an object in a same direction, for example, through two camera units. As described in Japanese Laid-open Patent Application No. 62-122493, a conventional stereoscopic image taking apparatus employs a stereoscopic image taking and focusing method for tracking an intersection between lens optical axes of two video cameras (hereinafter referred to as cameras) and performing focusing, based on a base length and an angle between the two cameras.

There are also various proposals of stereoscopic image displaying apparatus for displaying images taken by such multi-eye cameras. Among these stereoscopic image displaying apparatus is a so-called head-mounted display (hereinafter referred to as HMD), which is a display apparatus which can permit the observer to observe an enlarged screen of virtual images of taken images through a compact display unit mounted on the observer's head.

As for the image taking and/or displaying system mainly composed of the multi-eye camera and the HMD, there are proposed image taking and/or displaying systems, which are different from the prior art systems simply for taking and appreciating scenic images. Such systems are disclosed, for example, in U.S. Pat. No. 2,711,594, U.S. Pat. No. 3,205,303, and U.S. Pat. No. 3,670,097. In the systems, a sensor for detecting a moving direction of the observer's face is provided in the HMD, information about the moving direction is sent from the sensor to a control unit for controlling the camera posture, and a taking field of camera is changed so as to track the moving direction of the observer's face. According to this arrangement, when the observer simply changes the face into a desired direction, the camera is directed in the direction and sends an image of the external field in that direction as a camera signal to the HMD on the observer whereby the observer can observe the image in that direction.

As one close to the above system there is studied a tele-existence system in which a multi-eye camera is set on a robot equipped with a manipulator and set at a remote place or at a dangerous place, and then a stereoscopic image signal from the camera is received to be displayed on the HMD on the observer, thus enabling operations at the remote place.

The present applicant or assignee has proposed a multi-eye camera which can take a three-dimensional image and a horizontally wide image in Japanese Patent Application No. 5-211777 and an HMD display apparatus which can display a three-dimensional image and a horizontally wide image in Japanese Patent Application No. 5-92113.

SUMMARY OF THE INVENTION

Although the above conventional examples showed the system arrangement of the multi-eye camera and the HMD display apparatus, proposing the control of the camera posture and the remote operations as monitoring the stereoscopic image, they failed to suggest new image taking and/or displaying technology as a three-dimensional image taking and/or displaying system.

The conventional stereoscopic image taking and/or displaying systems had the following problems.

(1) The display apparatus cannot reproduce a change of taking conditions in image-taking, such as a change of a convergence angle. Then displayed images cannot reflect photographer's purpose, so that the observer has to watch unnatural stereoscopic images, which would result in physiological fatigue after long-time appreciation.

(2) A stereoscopic image taken through the multi-eye camera in image-taking cannot be correctly displayed on the spot as a stereoscopic image according to photographic conditions and photographic purpose. Therefore, the photographer cannot check by himself whether the image correctly reflects the photographic purpose.

As described above, the present applicant or assignee has proposed the multi-eye image taking camera which can take three-dimensional images and two-dimensional wide images and the HMD display apparatus which can display three-dimensional images and two-dimensional, horizontally wide images, but there has been no system proposed yet taking advantage of the features of the image taking camera and HMD display apparatus.

An object of the present invention is to provide an image taking and/or displaying system which can display an image correctly reflecting photographer's purpose.

An image taking and/or displaying system of the present invention is an image taking and/or displaying system which has an image-taking camera apparatus having image-taking means for producing a plurality of image signals corresponding to optical images from different visual points, and a display apparatus for guiding a pair of images displayed on a pair of image displaying means through a pair of projection optical systems to the observer's eyes so that the observer can observe enlarged, virtual images of said pair of images by the respective eyes, and in which the plurality of image signals from said image-taking camera apparatus are displayed on the pair of image displaying means in said displaying apparatus to permit the observer to observe them; or an image taking and/or displaying system which has an image-taking camera apparatus having image-taking means for producing a plurality of image signals corresponding to optical images from different visual points, and a displaying apparatus for guiding a pair of images displayed on a pair of image displaying means through a pair of projection optical systems to the observer's eyes so that the observer can observe enlarged, virtual images of said pair of images by the respective eyes and controlling positions of said displaying means relative to said projection optical systems or a focusing state of said projection optical systems whereby said displaying apparatus can control spatial positions of planes of said two virtual images between a superimposed state where the two images are superimposed on each other and an adjacent state where the two images are juxtaposed adjacent to each other, and in which the plurality of image signals from said image-taking camera apparatus are displayed on the pair of displaying means in said displaying apparatus to permit the observer to observe them. Further, the system is characterized in that control information of said image-taking camera apparatus is supplied to said displaying apparatus in addition to the plurality of image signals from said image-taking camera apparatus, and then the relative, spatial positions of said pair of enlarged, virtual images in said displaying apparatus are changed in accordance with said control information.

Further, an image taking and/or displaying system of the present invention is an image taking and/or displaying system which has an image-taking camera apparatus having image-taking means for producing a plurality of image signals corresponding to optical images from different visual points, an image information recording apparatus for recording the plurality of image signals from said image-taking camera apparatus in an image information recording medium, and a displaying apparatus for guiding a pair of images displayed on a pair of image displaying means through a pair of projection optical systems to the observer's eyes so that the observer can observe enlarged, virtual images of said pair of images by the respective eyes, and in which the plurality of image signals reproduced from the image information recording medium in said image information recording apparatus are displayed on the pair of displaying means in said displaying apparatus to permit the observer to observe them; or an image taking and/or displaying system which has an image-taking camera apparatus having image-taking means for producing a plurality of image signals corresponding to optical images from different visual points, an image information recording apparatus for recording the plurality of image signals from said image-taking camera apparatus in an image information recording medium, and a displaying apparatus for guiding a pair of images displayed on a pair of image displaying means through a pair of projection optical systems to the observer's eyes so that the observer can observe enlarged, virtual images of said pair of images by the respective eyes and controlling positions of said displaying means relative to said projection optical systems or a focusing state of said projection optical systems whereby said displaying apparatus can control spatial positions of planes of said two virtual images between a superimposed state where the two images are superimposed on each other and an adjacent state where the two images are juxtaposed adjacent to each other, and in which the plurality of image signals reproduced from the image information recording medium in said image information recording apparatus are displayed on the pair of displaying means in said displaying apparatus to permit the observer to observe them. Further, this system is characterized in that control information of said image-taking camera apparatus is also recorded in the image information recording medium in said image information recording apparatus in addition to said plurality of image signals and that the plurality of image signals and said control information reproduced from said image information recording medium are supplied to said displaying apparatus, and then the relative, spatial positions of said pair of enlarged, virtual images in said displaying apparatus are changed in accordance with said control information.

The present invention is intended to solve the above problems by proposing a system taking full advantage of the features of the multi-eye image-taking camera which can take two-dimensional wide images as well as three-dimensional images and the HMD display apparatus which can display not only three-dimensional images but also two-dimensional, horizontal wide images.

Namely, the present invention is intended to solve the above problems (1) and (2) in such a manner that the control information of the multi-eye camera in taking images is sent to the HMD display apparatus upon transmission of the image signals and, based on the control information, the positions of the display units in the HMD displaying apparatus are controlled or the focusing state of the projection optical systems in the HMD displaying apparatus are controlled so as to display the three-dimensional image correctly reflecting the photographer's purpose.

Also, the present invention involves such an arrangement that upon transmission of the image signals control information indicating whether the multi-eye camera in taking images is in a state where it is taking a two-dimensional (2D) image or in a state where it is taking a stereoscopic or three-dimensional (3D) image is sent to the HMD display apparatus, the control is performed based on the control information so as to control the positions of the display units in the HMD display apparatus or the focusing state of the projection optical systems in the HMD display apparatus, and display is changed over in the HMD between display of 2D wide image and display of 3D image to enable image display correctly reflecting the photographer's purpose, whereby the observer can enjoy the new image apparatus which can display the 3D image, the 2D wide image, or a mixture thereof.

Incidentally, the aforementioned conventional examples are so arranged that the convergence angle of the two cameras is adjusted according to an object in taking images thereof by the image-taking apparatus, but the display apparatus is so arranged that the display units cannot be adjusted to change a convergence angle of the two display units, based on the state of the cameras in taking images, which sometimes forces the observer to observe the images with convergence completely different from that in taking images. For example, even with an image of an object distant at about 1 m, the observer could observe the image with such convergence as if to observe an infinite view. Conversely, even though the image is of an infinite view, the observer could observe the image with such convergence as if to observe an object at 1 m in front thereof. Thus, the conventional systems had such a disadvantage that the stereoscopic effect was emphasized more than necessary or that the image was unnatural, which readily made the eyes very tired. Attempts have been made to fix the convergence approximately matching with the images and to allow manual adjustment of convergence. However, the same disadvantage still remains, because the convergence is not always adjusted to match with the taking conditions.

It is, therefore, another object of the present invention to provide an image taking and/or displaying system which can obtain natural images and which can relieve the stress on the eyes.

To achieve this object, the present invention involves such an arrangement that a state of cameras in taking images is detected and a state of display units is adjusted based on the detected information. Specifically, the image taking and/or displaying system is arranged based on the following (1) to (5).

(1) The system is an image taking and/or displaying system in which images taken by an image-taking apparatus having a plurality of video cameras are displayed by a displaying apparatus having a same or less number of display portions as or than the number of said video cameras, in which said image-taking apparatus is provided with camera state detecting means for detecting a state of said video cameras in taking images and said displaying apparatus is provided with controlling means for controlling a state of said display portions in accordance with an output from said camera state detecting means.

(2) The system is provided with adjusting means for advancing camera state information detected by the camera state detecting means relative to image information.

(3) The camera state information is information about the convergence angle of the video cameras.

(4) The adjusting means is for advancing a phase of the camera state information relative to the image information by a timing to read the information from a memory.

(5) The adjusting means is for advancing a phase of the camera state information relative to the image information by arranged positions of reproducing heads for reading the information from a recording medium.

According to either one of the above (1) to (5), the state of the display portions is controlled according to the state of the video cameras. According to either one of the above (2) to (5), there remains no time lag of change in the state of the display portions with respect to the images.

Another object of the present invention is to provide a multi-eye image-taking apparatus which can make a display apparatus display natural images whereby the stress on the eyes can be relieved.

To achieve the above object, the present invention involves such an arrangement that the multi-eye image-taking apparatus outputs camera state information with a phase advancing with respect to the image information together therewith.

Specifically, the multi-eye image-taking apparatus is arranged based on the following (1) and (2).

(1) The multi-eye image-taking apparatus is arranged to be provided with a plurality of video cameras, convergence angle adjusting means for adjusting a convergence angle of the video cameras, convergence angle detecting means for detecting the convergence angle adjusted by the convergence angle adjusting means, and adjusting means for advancing information on the convergence angle detected by the convergence angle detecting means ahead of the image information from the video cameras.

(2) The multi-eye image-taking apparatus is arranged to be further provided with mode changeover means for changeover between a stereo mode and a panorama mode, whereby an initial value of the convergence angle adjusting means is set in accordance with the mode changeover by the mode changeover means.

According to either one of the above (1) and (2), the multi-eye image-taking apparatus can obtain the image information and the convergence angle information going ahead of the image information. According to the above (2), the mode can be changed over between the stereo mode and the panorama mode, so that the initial value of convergence angle can be set in accordance with the mode changeover.

BRIEF DESCRIPTION OF THE DRAWINGS

FIG. 11 is a drawing to show the structure of a system of the third embodiment;

FIG. 15 is an explanatory drawing of a panorama mode;

FIG. 15A illustrates the image viewed by the left camera in FIG. 15;

FIG. 15B illustrates the image viewed by the right camera in FIG. 15;

DETAILED DESCRIPTION OF THE PREFERRED EMBODIMENTS

Figure 1:
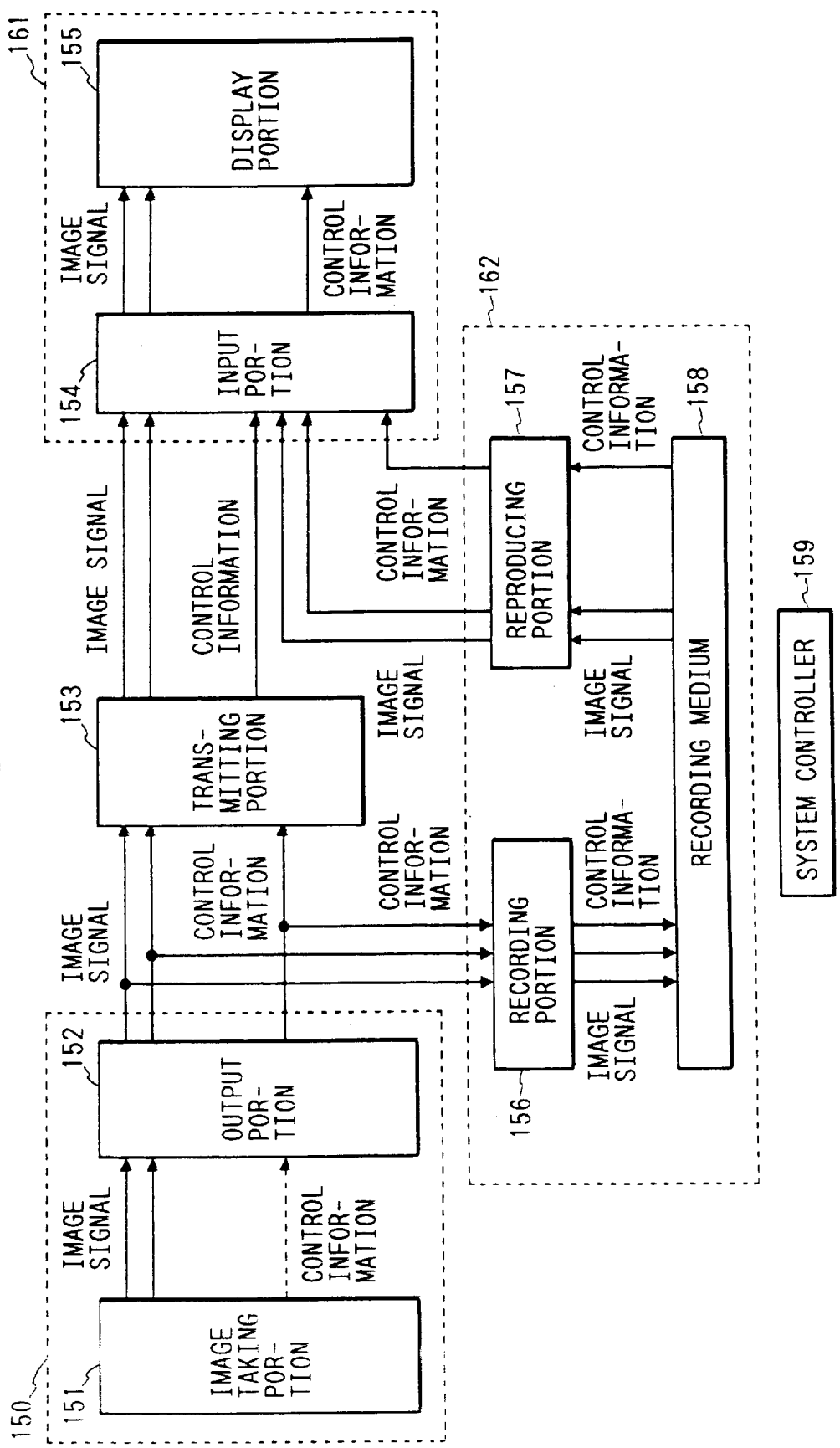
FIG. 1 is a block diagram to show an image taking and/or displaying system of the first embodiment of the present invention.

FIG. 1 is a block diagram to show an image taking and/or displaying system of the first embodiment of the present invention. The present embodiment has an image-taking portion 151, an output portion 152 for outputting image signals and control information, a transmitting portion 153 for transmitting the image signals and control information, an input portion 154 for receiving the image signals and control information, a display portion 155, a recording portion 156 composed of a circuit for recording the image signals and control information, a recording medium 158, a reproducing portion 157 composed of circuits for reproducing the image signals and control information from the recording medium 158, and a system controller 159 for controlling the entire system. Although not shown in FIG. 1, it is noted that the system controller 159 is connected to the respective blocks in the drawing.

Next described are flows of signals in FIG. 1.

The control information is transmitted together with the image signals from the image-taking portion 151 to the output portion 152. The control information consists of information about a mutual, optical, positional relation between image-taking devices in the image-taking portion 151, image-taking conditions of the respective image-taking devices, etc. Here, the information about the mutual, optical, positional relation between a plurality of image-taking devices means, for example, information about a cross angle between the optical axes of two image-taking devices, which is a convergence angle, and, further, the information about the image-taking conditions of each image-taking device means, for example, information about aperture, information about distance, information about zooming (focal length), etc. The output portion 152 functions to adjust deviation of time base between the image signals from the image-taking devices and the above control information. After adjusting correspondence between the both, the output portion 152 outputs the signals to the transmitting portion 153 and to the recording portion 156. Although this drawing indicates double path output lines for the image signals and a single path output line for the control signal, the output portion 152 may be arranged to output signals in which part or all of the control information is added to the image signals. Also, the image signals may be arranged as a single-path signal by the operation such as the time-base compression or the thinning-out. The transmitting portion 153 is normally composed of cables for transmitting the signals. If the image-taking portion 151 and the output portion 152 are located at a remote place, the transmitting portion 153 should have circuits for modulating and demodulating the signals in the appropriate form for transmission. The input portion 154 receives the signals from the transmitting portion 153 or from the reproducing portion 157, having a function to switch the inputs from one to another with necessity. If the control information is arranged to be added to the image signals, the input portion 154 separates a mixed signal into the original image signals and control information. The display portion 155 processes the image signals into the form suitable for display and controls the convergence angle or the like for a plurality of display units, based on the control information. On the other hand, in case of the signals from the image-taking portion 151 being once recorded in the recording medium 158, the signals are converted into a form suitable for recording in the recording portion 156, and the converted signals are recorded in the recording medium 158. Here, if a moving picture is recorded in the recording medium 158, the recording medium 158 may be a medium such as a magnetic tape, for example. In case of recording a short-time moving picture or a still image, the recording medium may be a magnetic disk, a magneto-optical disk, etc. The reproducing portion 157 reproduces the signals (image signals and control information) from the recording medium 158 and sends them to the input portion 154.

Figure 2:
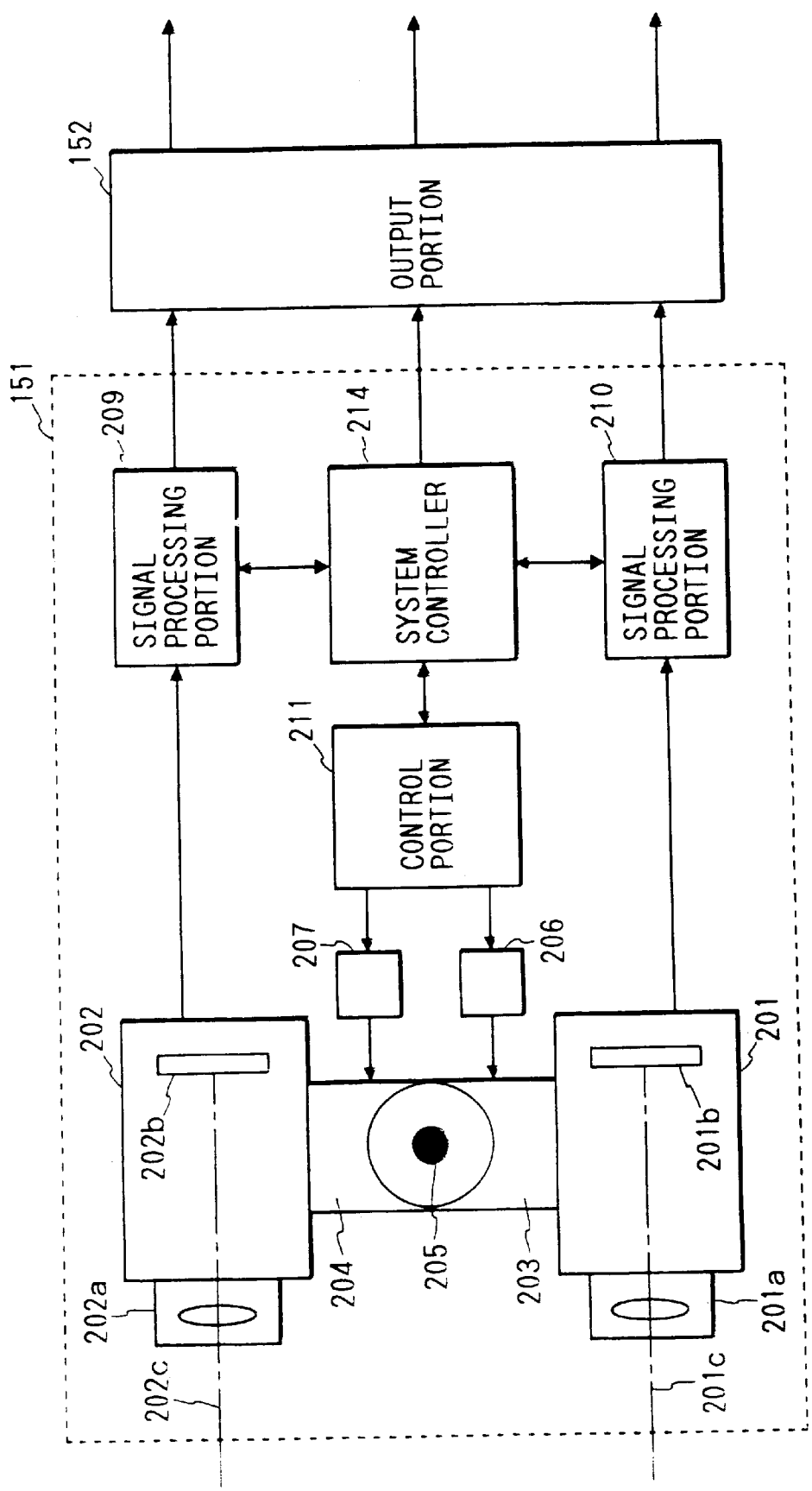
FIG. 2 is a block diagram of an image-taking portion 151.

Also, the image data may be subjected to compression prior to transmission or recording. (The compression method may be the JPEG method or MPEG method, for example.) FIG. 2 is a block diagram of a multi-eye camera portion 160 composed of the image-taking portion 151 and output portion 152 shown in FIG. 1. In the multi-eye camera each image-taking system 201 or 202 has an optical system 201a or 202a and an image sensor 201b or 202b, respectively. Further, 201c or 202c is an image-taking optical axis of the image-taking system 201 or 202, respectively. An arm 203 or 204 is an arm for supporting the image-taking system 201 or 202, respectively, which is arranged as rotatable about a shaft 205 fixed on the unrepresented main body of the multi-eye camera. The shaft 205 is arranged an equal distance away from the image-taking optical axes 201c, 202c. An actuator 206 or 207 rotates the arm 203 or 204, respectively, about the shaft 205. In FIG. 2, the image-taking systems 201, 202 are focused at infinity, so that the convergence angle between the image-taking systems 201, 202 is 0°, that is, the image-taking systems 201, 202 are parallel to each other. A signal processing portion 210 or 209 is a signal processing portion for converting a camera signal from the image-taking system 201 or 202, respectively, into an appropriate image signal. If the image sensors 201b, 202b each are constructed of a single-tube type color camera, the signal processing portions perform processes including the sample hold, the color separation, the γ-exchange, etc. In the case of the embodiment shown in FIG. 2, the signal processing portions 209, 210 convert the image signals into composite video signals, for example, in the NTSC method, each being output through a single-path signal line. The image signals may be arranged to be output as component color signals such as RGB signals. A control portion 211 controls the aperture, focus, and convergence angle of the image-taking systems 201, 202. A system controller 214 controls the signal processing portions 209, 210 and the control portion 211.

Figure 3:
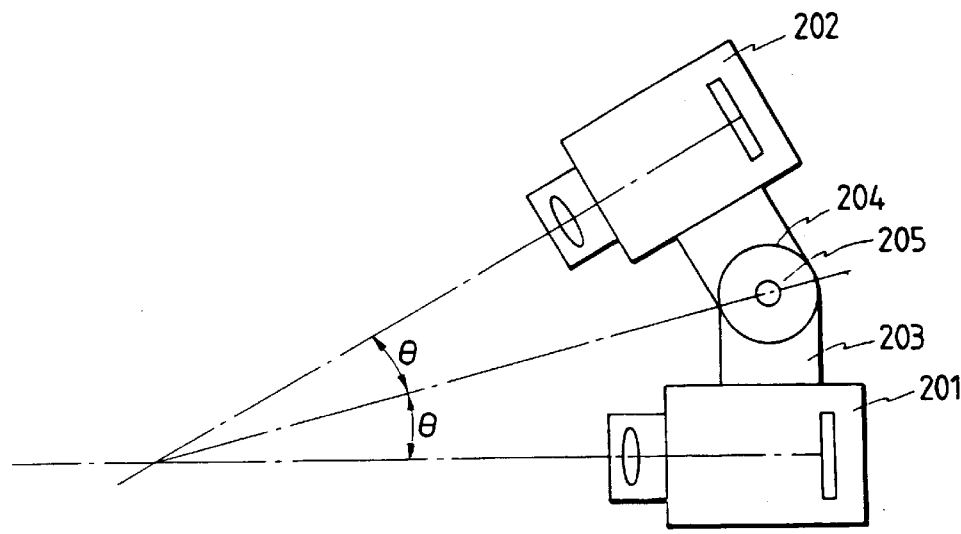
FIG. 3 is a drawing to show the image-taking portio 151 in case of the convergence angle being θ.

FIG. 3 is a drawing to show an example where the convergence angle of the image-taking portion 151 is θ.

Figure 4:
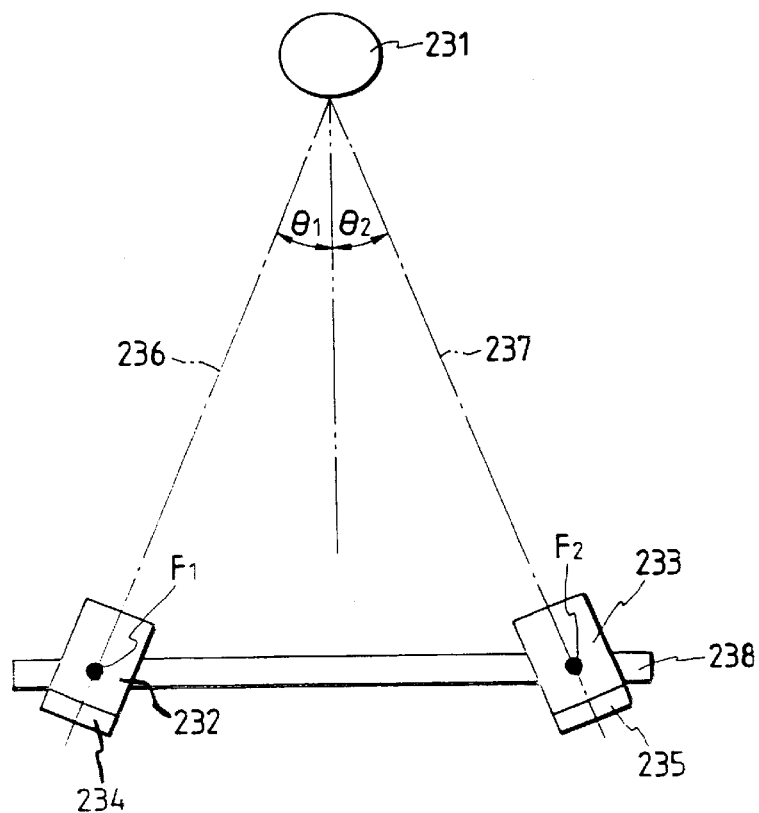
FIG. 4 is a drawing to show another arrangement of an image-taking system and a mechanical system for multi-eye camera.

FIG. 4 is a schematic drawing to show another structure of image-taking systems 201, 202 and a mechanical system for the multi-eye camera. Numeral 231 designates an object, and 232, 233 first and second image-taking optical systems having equivalent specifications, which are generally zoom lenses. Numerals 234, 235 are image sensors similarly having equivalent specifications, which are camera tubes such as Saticon or solid state imaging devices such as CCD.

Each image-taking optical system 232, 233 can horizontally move through a slide mechanism 238, whereby the base length can be adjusted. The optical axis 236 or 237 of each image-taking optical system 232 or 233 is arranged as rotatable about $F_1$ or $F_2$, respectively. The image-taking optical systems 232, 233 are arranged as rotatable independently of each other. In FIG. 4, the image-taking optical systems 232, 233 are arranged at respective angles $\theta_1$, $\theta_2$, each of which is an angle between the axis 236, 237 and the normal line to a line connecting $F_1$ and $F_2$ and passing the object 231.

Figure 5:
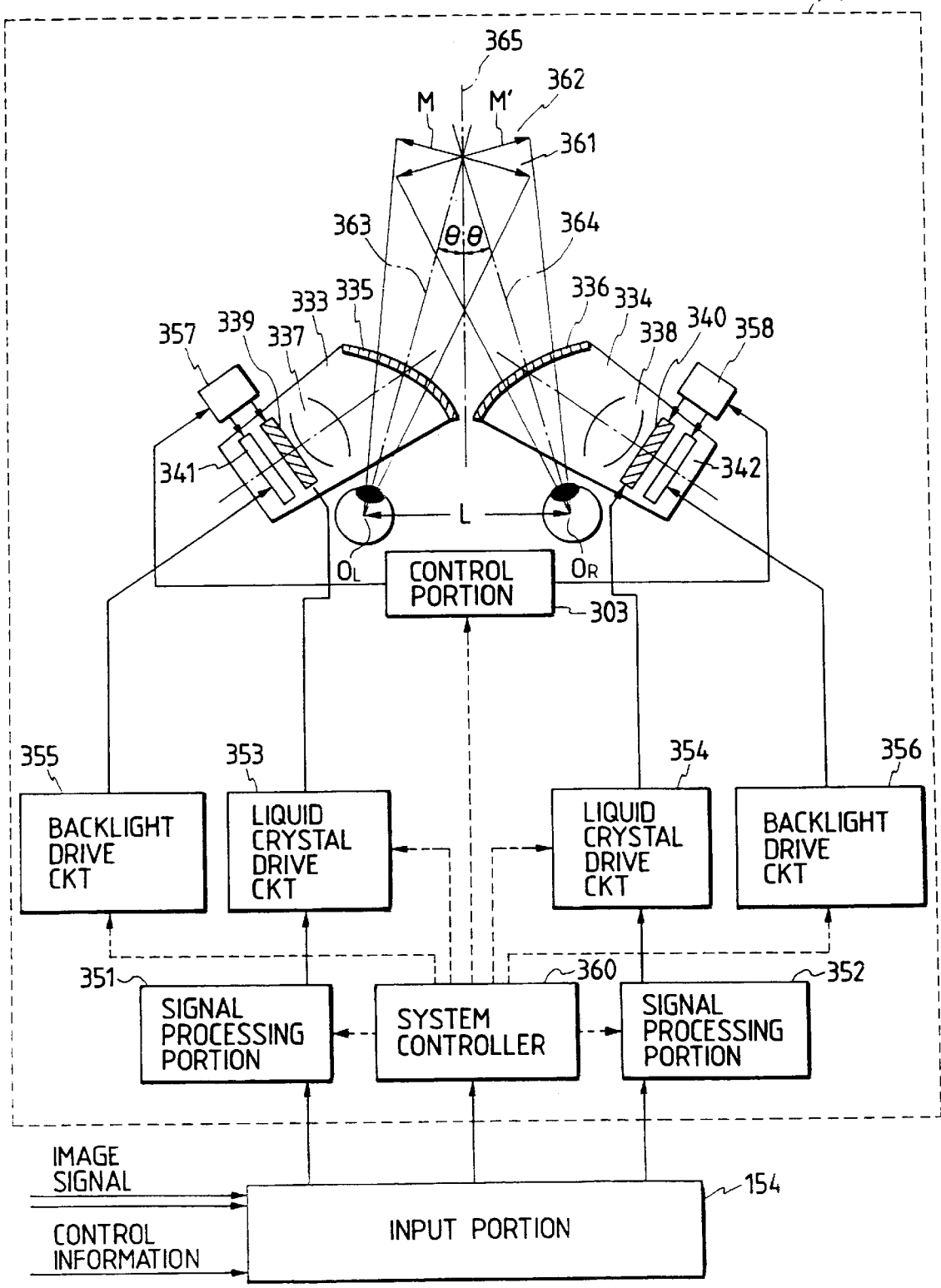
FIG. 5 is a block diagram of an HMD portion 161.

FIG. 5 is a block diagram of an HMD portion 161 composed of the input portion 154 and display portion 155 shown in FIG. 1, showing an arrangement for displaying a stereoscopic image. The unrepresented main body of the HMD portion is molded of a plastic in the form of goggle, which is mounted on the head through a belt and has a transparent protection window not shown in the front surface portion. Numerals 333, 334 denote left and right display units. The left or right display unit 333 or 334 is illuminated by a backlight source 341 or 342, respectively, each composed of a cold cathode tube, and then an image displayed on a liquid crystal display panel (hereinafter called as LCD) 339, 340 is guided through a relay optical system 337, 338 and via a virtual image forming optical element 335, 336 to the left or right eye as being displayed as an enlarged, far, virtual image independently of the other for the left or right eye. The virtual image forming optical element 335, 336 is an aspherical half mirror, which functions as a combiner enabling to observe the external view through the transparent protection window and the image from LCD 339, 340 in a superimposed manner. An actuator 357 or 358 as detailed below rotates the left or right set of the backlight source 341, 342 and LCD 339, 340 together along a rotation guide not shown about a position optically equivalent to the left or right eyeball center $O_L$, $O_R$. To simplify the mechanism, they may be arranged to linearly move along a direction perpendicular to the optical axis. Here, the present invention can employ a spherical lens system, the hologram, etc. for the virtual image forming optical element 335, 336. The optical element 335, 336 does not always have to be of the reflection type, but may be of the transmission type similarly to display the enlarged, virtual image. The relay optical system 337, 338 can be arranged to have functions to correct the residual aberration, to converge the beam from the display unit to form an intermediate image, etc. A left or right virtual image 361 or 362 is formed with the size H of image and at a position a distance a away from the eyeball center $O_L$ or $O_R$, respectively. Each of numerals 363, 364 is a line connecting the center of left or right virtual image plane with the center of the observer's pupil, which is normal to the virtual image 361 or 362. The lines 363, 364 intersect with each other at the center M, M' of the left and right virtual images. Numeral 365 is a perpendicular bisector plane to the base line $O_L O_R$ (length L) connecting the centers of the both eyeballs $O_L$, $O_R$, making angles $\pm\theta$ with the two axes 363, 364. A signal processing portion 351 or 352 is a signal processing portion for converting the image signal for LCD 339 or 340, respectively, into a signal form suitable for LCD display. This block includes a decoding circuit for converting a composite signal into RGB, an inverse $\gamma$ conversion circuit for controlling grey level characteristics, etc. A drive circuit 353 or 354 for LCD 339 or 340 includes a polarity inverting circuit for performing inversion drive, a circuit for setting an offset voltage, etc. An inverter circuit 355 or 356 drives the backlight source 341 or 342, respectively. The actuator 357 or 358 is driven by a control signal from a control portion 303 to rotate the display unit 333 or 334, respectively. A system controller 360 controls the HMD portion 161. It amplifies audio signals sent from an unrepresented audio signal apparatus to reproduce stereo sounds corresponding to the images through unrepresented headphone speakers.

Figure 6:
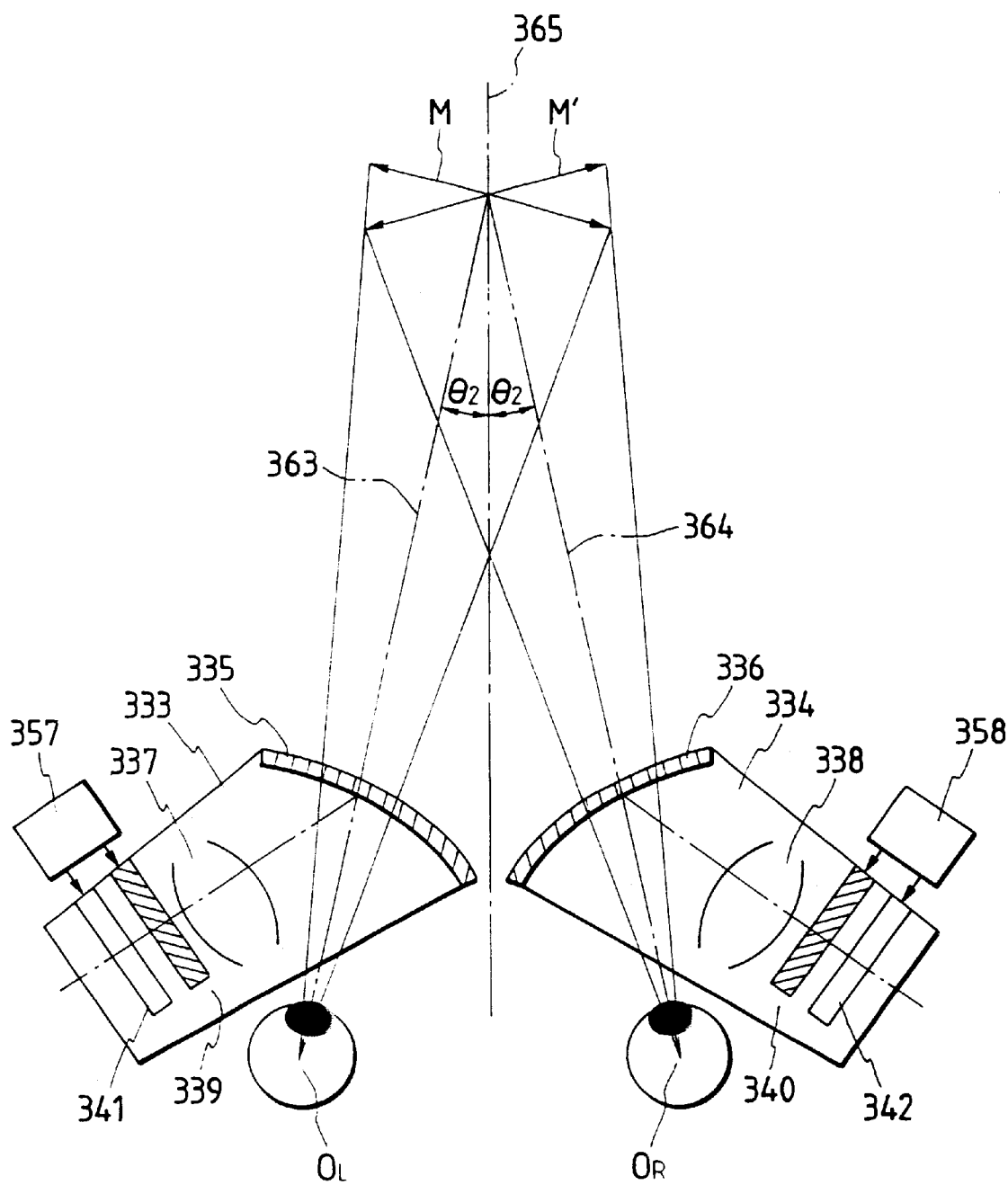
FIG. 6 is a drawing to show a state of the operation of backlight sources 341, 342 and LCDs 339, 340.
Figure 7:
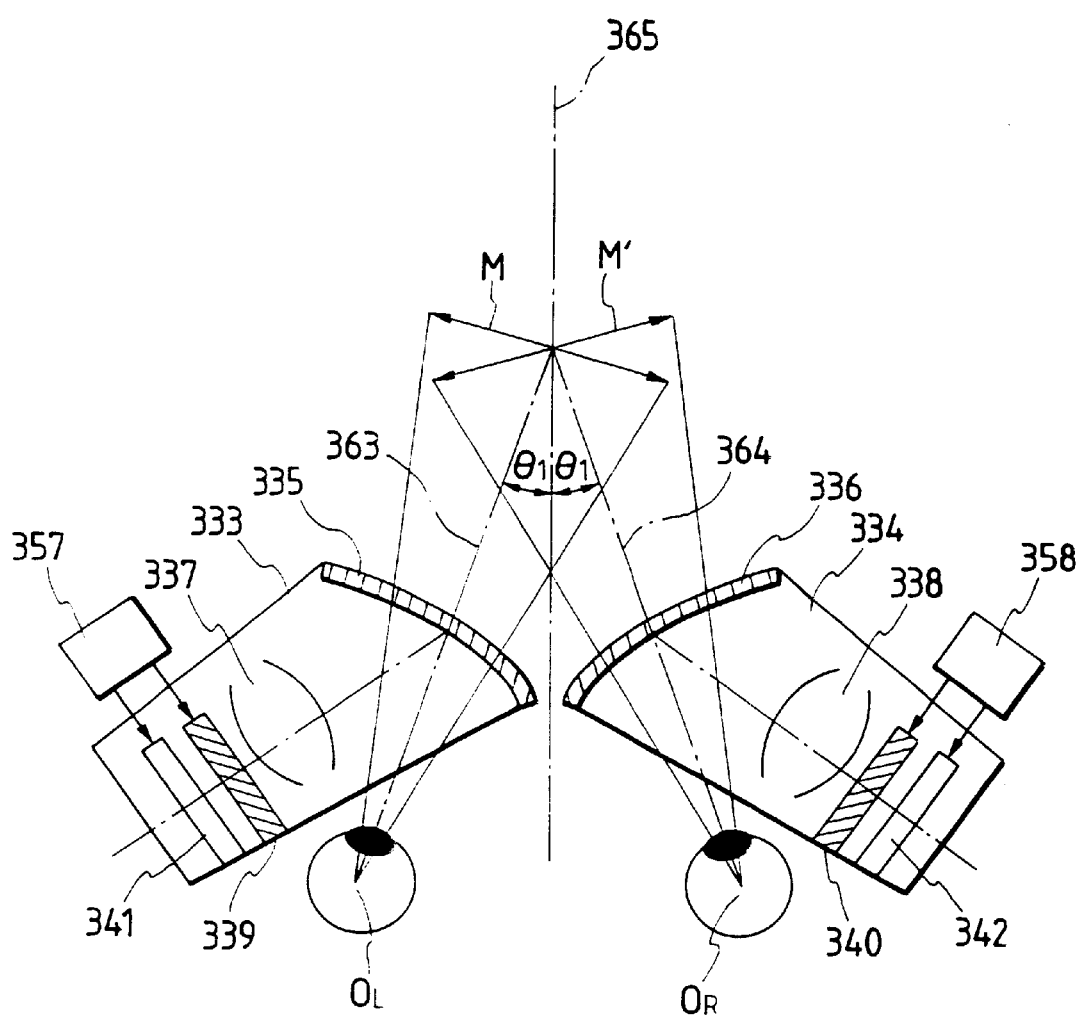
FIG. 7 is a drawing to show another state of the operation of backlight sources 341, 342 and LCDs 339, 340.

FIG. 6 and FIG. 7 show operations of the backlight sources 341, 342 and LCDs 339, 340. Generally, the stereoscopic view becomes possible by presenting two images (stereo pair) having binocular parallax for the left and right eyes. Fusion of image of the stereo pair can be facilitated by presenting the two virtual images as superimposed in the HMD portion 161. As shown in FIG. 6 and FIG. 7, the backlight sources 341, 342 and LCDs 339, 340 are moved before both the centers M, M' of the left and right virtual images come to respective positions nearly on the perpendicular bisector plane 365. The left and right virtual images are formed in symmetry with each other with respect to the plane 365. The fusion of the stereo pair is completed when the optical axes of the left and right eyeballs come to coincide with the center axes of the displayed images on the display units 333, 334, respectively. FIG. 7 shows an example where a nearer object is observed than that in FIG. 6, and the convergence angle is $\theta_1$. FIG. 6 shows an example where a farther object is observed than that in FIG. 7, and the convergence angle is $\theta_2$. The convergence angles $\theta_1$, $\theta_2$ are normally controlled to reproduce the convergence angles in taking images by the multi-eye camera 160.

Figure 8:
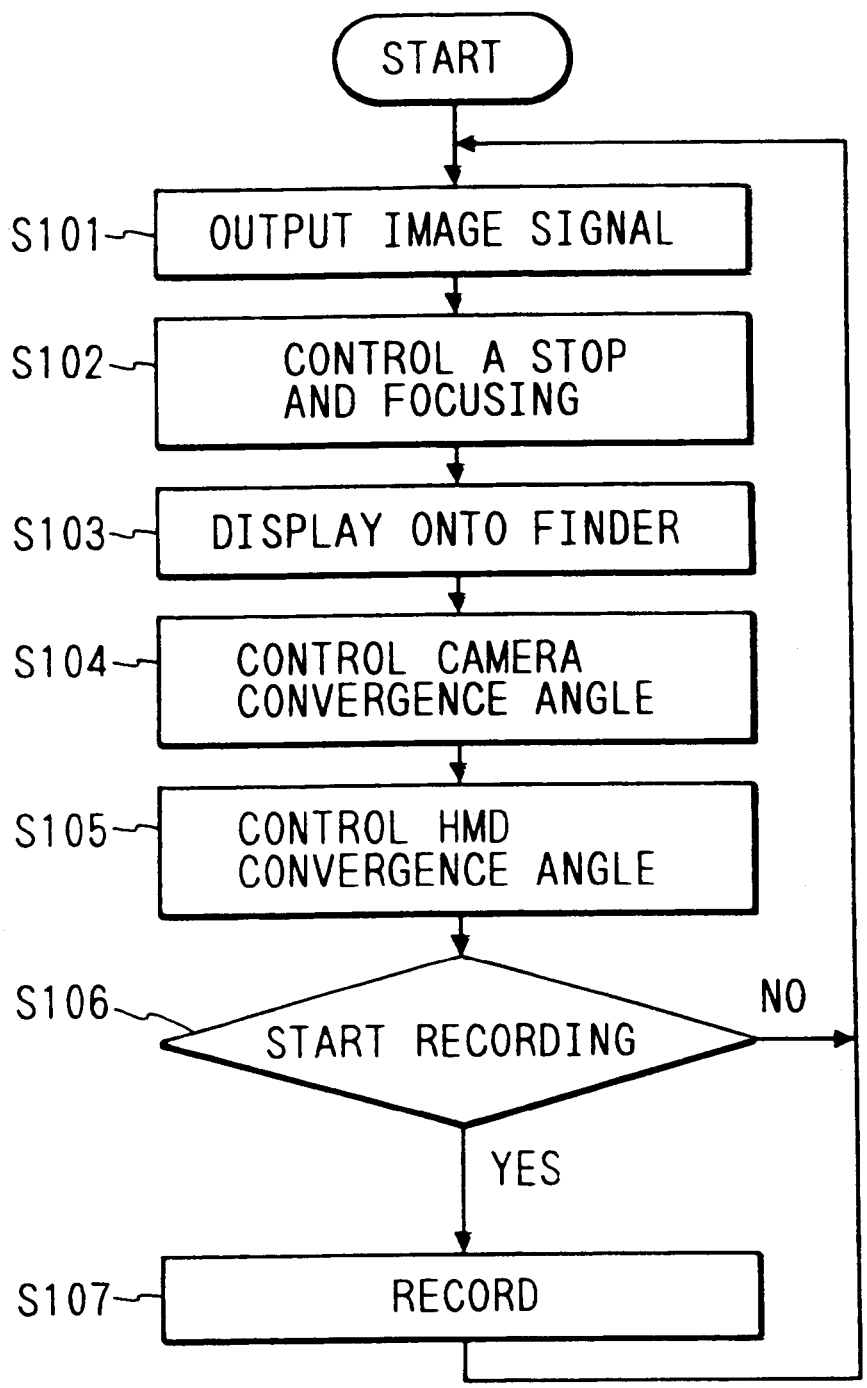
FIG. 8 is a flowchart to show the operation of the image taking and/or displaying system shown in FIG. 1 to FIG. 5.

FIG. 8 is a flowchart to show the operation of the multi-eye camera-HMD system as described with FIGS. 1 to 4. Unless stated otherwise, processes are performed by the system controller 159, and the left and right image signals are nearly synchronized with each other. Further, if the image data is compressed upon taking images or in recording image signals, the data is assumed to be expanded in displaying the images. First, turning on an unrepresented power switch, image signals are output from the image-taking systems 201, 202 (step S101). The image signals are put into the system controller 214 to control the aperture and focus of the image-taking systems 201, 202 (step S102). The above image signals are also put into the HMD portion 161 to display the images (step S103). Also, the system controller 214 calculates a control amount of the convergence angle from the focus information and, based on the calculation result, rotates a predetermined amount the actuators 206, 207 for rotating the arms 203, 204 about the shaft 205 (step S104). The information about the convergence angle of the multi-eye camera is sent to the system controller 360 in the HMD portion 161, and the control portion 303 rotates a predetermined amount the display units 339, 341, 340, 342 through the actuators 357, 358 (step S105). Then a decision is made as to if an unrepresented image-taking start switch is turned on (step S106). When the image-taking start switch is turned on, the image signals and control information start being recorded in the recording and reproducing block 162 (step S107).

Figure 9:
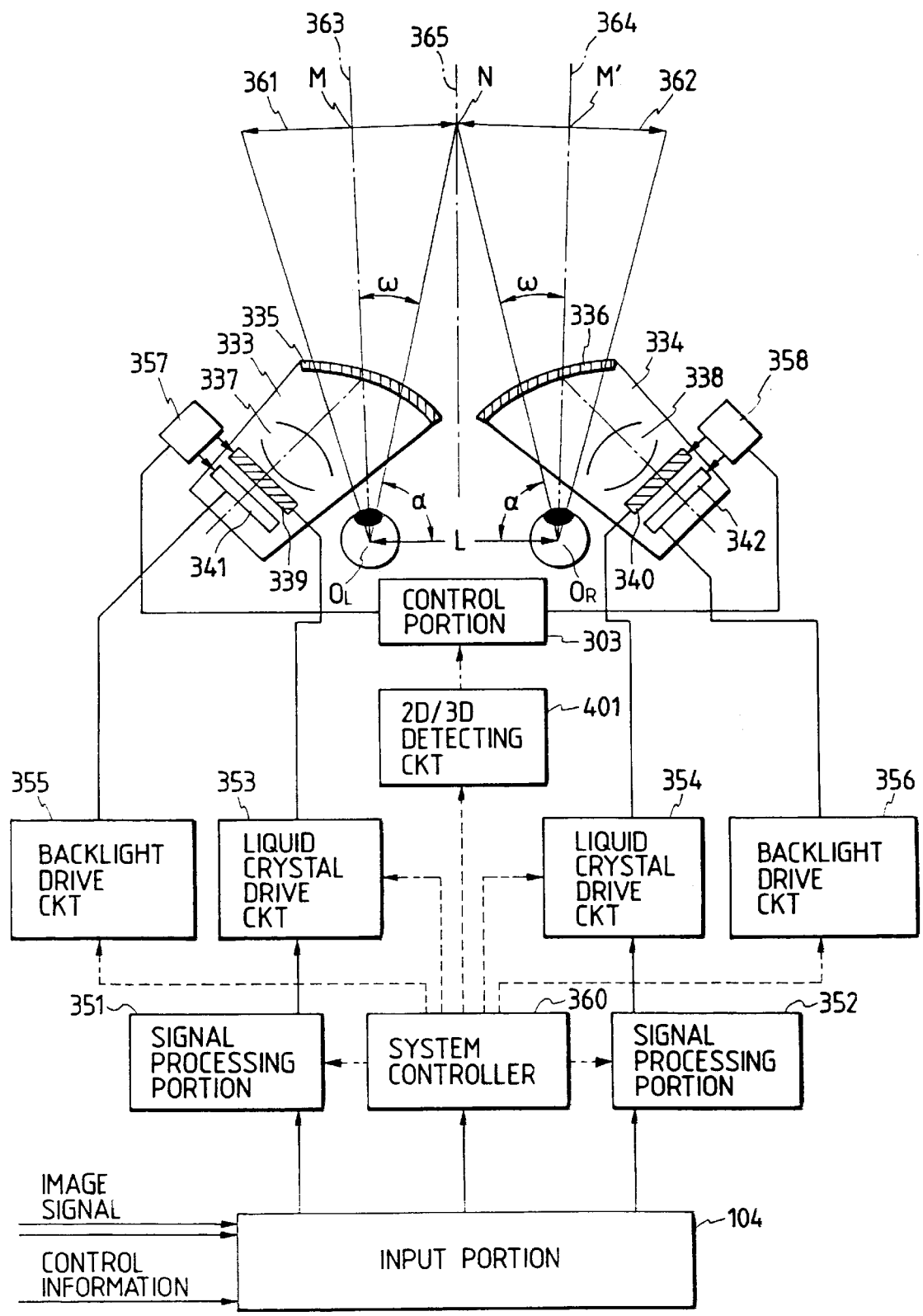
FIG. 9 is a block diagram of an image taking and/or displaying system of the second embodiment of the present invention.

FIG. 9 is a block diagram to show the second embodiment of the present invention.

The present embodiment is so arranged as to take and display not only a stereo image but also a panorama image. Detailed description of the camera system will be omitted, because sufficient information is images and information about the convergence angle supplied to the displaying apparatus. Thus, the displaying apparatus is described below with FIG. 9. Among constituents in FIG. 9, those common to FIGS. 2 to 4 are omitted to explain herein. In FIG. 9, a 2D–3D detecting circuit 401 is newly added. This circuit 401 is for discriminating stereoscopic photography (3D photography) from panorama photography (2D photography), based on the control information sent from the multi-eye camera portion. Normally, the multi-eye camera portion adds the information for discriminating 2D from 3D to the control information, and sends the information to the HMD. In case of no discrimination information being added, the discrimination is made based on the information about the convergence angle or the information about the focal length. The control portion 303 performs the changeover between the stereo display state and the panorama display state, based on the discrimination result of the 2D–3D detecting circuit 401. For panorama display, the virtual images for the left and right eyes need to be juxtaposed without a gap adjacent to each other on the plane 365 in the displaying apparatus, as shown in FIG. 9. Thus, the convergence angle is adjusted in such a manner that the left edge of the virtual image for the right eye comes in contact with the right edge of the virtual image for the left eye at point N on the plane 365. Here, $\theta=90°-\omega-\alpha$, where $\omega(\omega>0)$ is an angle of view of the virtual images 361, 362 and $\alpha(\alpha>0)$ is an angle between the base line $O_L O_R$ which is a straight line connecting the centers of the left and right eyeballs, and either one of the straight lines $O_L N$, $O_R N$, as shown. In this case, $\omega=\tan^{-1}(H/2a)$ and $\alpha=\cos^{-1}(L\cos\omega/2a)$. Since L=65 mm, H=1219.2 mm, and a=1500 mm in the present embodiment, $\theta=20.97°$, calculated with the information from the multi-eye camera. The arrangement of the display units 333, 334 is adjusted so that the convergence angle $\theta$ becomes this angle. When a panorama image is observed by the above means, an apparent angle of view is about 4 ω=88.48°, thus providing the image with a very wide angle of view. Since the human eyes do not normally rotate outward, the observer's visual axes at this moment are directed along directions different from the convergence angle.

Figure 10A:
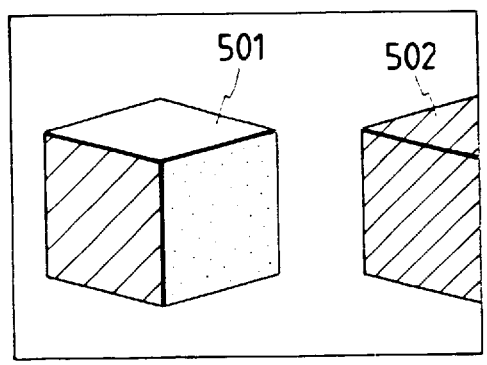
FIGS. 10A, 10B, and 10C are drawings to show an example of left and right images displayed on the LCDs 339, 340.
Figure 10B:
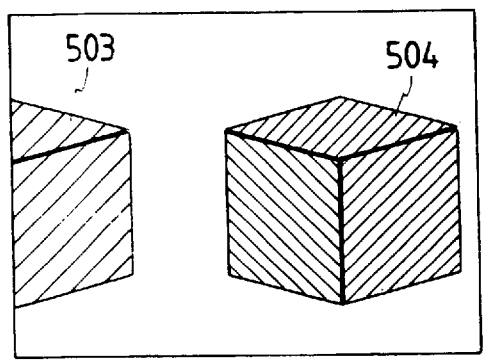
Figure 10C:
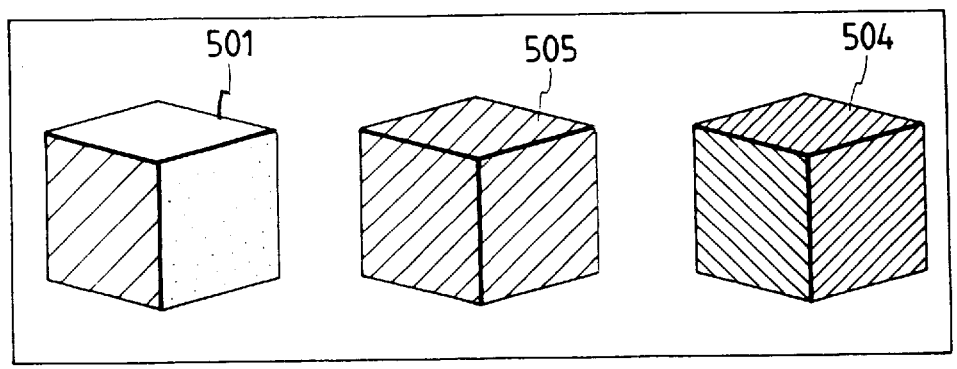

FIGS. 10A and 10B show an example of left and right images displayed on the LCDs 339, 340. FIGS. 10A and 10B show left and right images displayed on the respective display units. The panorama view of the images through the present system can provide a connected image like 505 from two separate square images 502, 503, as shown in FIG. 10C, thus obtaining images 501, 505, 504 with a very wide angle of view as a whole.

The above description concerned the case where the convergence angle was adjusted by changing the positions of the LCDs and the backlight sources with respect to the projection optical systems in the HMD or the case where the display was changed over between the panorama display and the stereo display, but the present invention is by no means limited to the examples. The same effects can be achieved by other means as described in the previously-described Japanese Patent Application No. 5-92113, which was proposed by the present applicant or assignee. Namely, the following arrangements can be applicable.

(1) Keeping the relative, positional relation between the display unit and the projection optical system, they are horizontally rotated about the center of the observer's pupil.

(2) The display unit and the projection optical system are horizontally moved.

(3) Fixing the display unit, only the projection optical system is horizontally moved.

(4) Optical deflecting means or movable reflection optical means is set between the observer's pupil and the display unit, and the position of the virtual image is horizontally moved by the optical deflecting means or movable reflection optical means.

(5) Fixing the display unit and the projection optical system, the displayed image is horizontally moved on an electric basis.

Also, the above description concerned the case where the left and right virtual image planes projected in the HMD were perfectly superimposed on each other or the case where they were juxtaposed adjacent to each other without overlapping, but the follow-up of the convergence angle can be effected even in a case where the two virtual image planes partly overlap with each other as described in the above Japanese Patent Application No. 5-92113.

FIG. 11 is a block diagram to show an image taking and/or displaying system of the third embodiment of the present invention. In FIG. 11, reference numeral 101 designates a multi-eye image-taking apparatus, 102 a recording portion, 103 a reproducing portion, 104 a displaying apparatus, and 105 a recording medium.

The multi-eye image-taking apparatus 101 is provided with detecting means for detecting a state of cameras, such as the convergence angle in taking images, to output it as camera state information. Signals of images taken by the multi-eye image-taking apparatus 101 are recorded together with a signal of the camera state information in a video tape 105 by the recording portion 102. The signals recorded in the video tape 105 are reproduced by the reproducing portion 103 to be put into the displaying apparatus 104. In this embodiment, the camera state signal is reproduced a predetermined phase ahead of the image signals, and the advancing camera state information is used to judge how to adjust the posture of the displaying portion in correspondence with the image, whereby the posture of the displaying portion can be adjusted without a time lag for the image.

The detailed structure of each constituent is described in the following.

Figure 12:
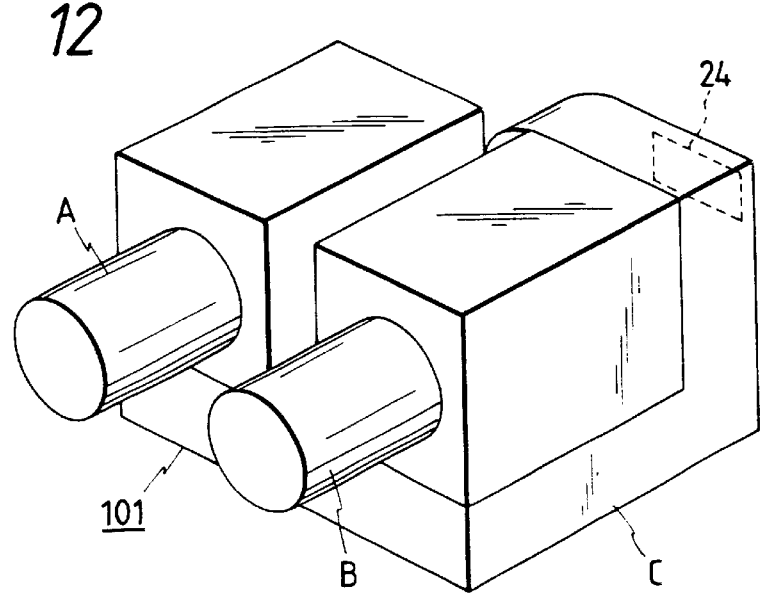
FIG. 12 is a schematic perspective view to show the appearance of a multi-eye image-taking apparatus employed in the third embodiment.
Figure 14:
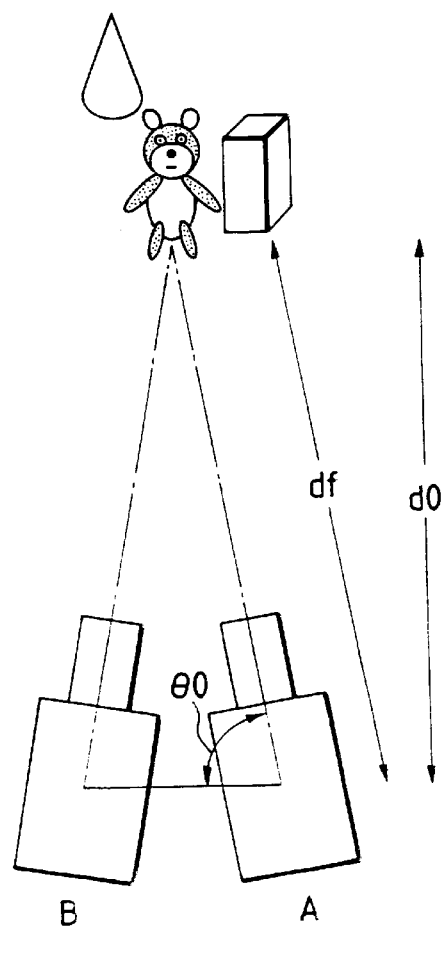
FIG. 14 is an explanatory drawing of a stereo mode.

First described is the multi-eye image-taking apparatus 101 employed in the system of the present embodiment. FIG. 12 is a perspective view to show schematic appearance of the multi-eye image-taking apparatus 101 employed in the present embodiment. First and second video camera portions A, B are arranged in an approximately same direction and approximately in parallel with each other, which are incorporated by combining means C. Each video camera portion A, B is composed of a main body portion, an optical system portion, and an electric circuit portion inside the main body, and an imaging device employed is a solid state imaging device such as the CCD. Also, the multi-eye image-taking apparatus is provided with a viewfinder 24 for indicating a camera output from the video cameras A, B.

The stereo photography is one of functions of the multi-eye image-taking apparatus. In order to realize the stereoscopic view of images taken through the first and second camera portions A, B, it is necessary that the two images be superimposed on each other on a screen or on a screen of CRT or that virtual images thereof be superimposed on each other. Then, the stereoscopic effect must be obtained when the images are superimposed. To attain the effect, the images need to be taken while the optical axes of the first and second video camera portions A, B intersect with each other on the object side. To optimize the stereoscopic effect, the position of the intersection between the optical axes of the first and second video camera portions A, B needs be adjusted in accordance with a distance between the object and the cameras. The multi-eye image-taking apparatus employed in the present embodiment is constructed taking this point into consideration. Also, the multi-eye image-taking apparatus employed in the present embodiment is arranged to enable the panorama photography in addition to the stereo photography by changing over a switch, as detailed later.

Figure 13B:
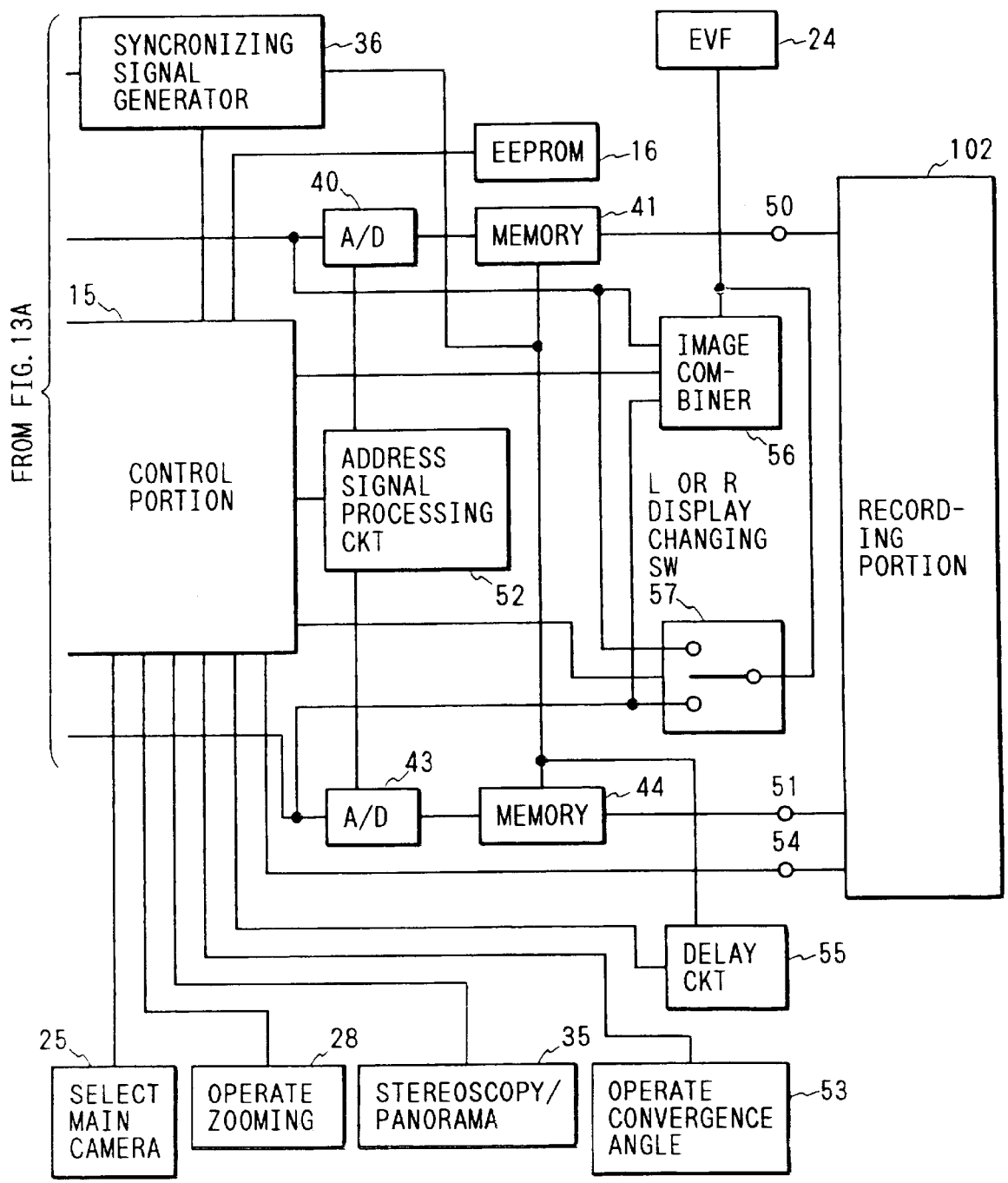
FIG. 13 is comprised of FIGS. 13A and 13B showing block diagrams of the structure of the multi-eye image-taking apparatus employed in the third embodiment.

The structure of the multi-eye image-taking apparatus 101 employed in the present embodiment is more specifically described in the following with reference to FIGS. 13A and 13B.

Light for the right eye passes through a lens group 1 and is picked up by an imaging device 2 inside the right camera A to be output as a right eye image signal. On the other hand, light for the left eye passes through a lens group 4 and is picked up by an imaging device 5 inside the left camera B to be output as a left eye image signal. The outputs each are subjected to a process as detailed below and then are recorded in the recording medium 105.

Each of the left and right cameras is provided with zooming and focusing motors for driving the lens group 1, 4, which are a right zoom motor 7 and a right focusing motor 8 or a left zoom motor 9 and a left focusing motor 10. Also, the lens group 1 or 4 is provided with an aperture stop 3 or 6 for adjusting an amount of received light by the imaging device. Further, position detectors 11, 13, 12, 14 are provided for detecting positions of lenses driven by the zoom motors 7, 9 and the focusing motors 8, 10, and outputs therefrom are supplied to a control portion 15. Each camera A, B is provided with a distance detector 33, 34, for example, composed of a light-emitting device and a light-receiving device, which detects a distance to an object to supply it to the control portion 15. Further, at least one of the distance detectors 33, 34 is arranged as horizontally rotatable, so that they can measure a distance to an object in a direction assigned by an instruction from the control portion 15. Numeral 16 denotes an EEPROM, in which various data was written in production, such as variations of sensitivity of the imaging devices, individual differences of the left and right lens groups, and initial values of angles of and a distance between the two cameras as described below.

Further, a right convergence angle motor 17 or a left convergence angle motor 18 is provided for horizontally rotating the associated camera nearly about the rotational center of the light-receiving surface of the imaging device 2 or 5, respectively. Also, the left or right camera B or A is provided with a rotation angle detector 20 or 19, respectively, an output from which is supplied to the control portion 15. In addition, the right camera A has an adjusting portion 21 for adjusting a gap between the left and right cameras, an adjusting motor 22 for driving the adjusting portion 21, and a gap detector 23 for detecting the gap between the left and right cameras, and an output from the detector 23 is supplied to the control portion 15.

The imaging devices 2, 5 are driven as synchronized with each other by a synchronizing signal generator 36. Analog image signals output from the devices 2, 5 are let to pass unrepresented amplifiers and to enter A/D converters 40, 43, respectively, for converting the analog image signals into digital image signals. An address signal processing portion 52 puts address signals to the digital image signals output from the A/D converters 40, 43 and to the camera state information signal as detailed below to give synchronization between them. The left and right digital image signals with the address signals are stored in image memories 41, 44, respectively, controlled in writing and/or reading by the synchronizing signal generator 36 and a phase shift signal generator 55. Numeral 24 denotes a viewfinder, in which the analog image signals before supplied to the A/D converters 40, 43 can be observed as synthesized or as switched from one to another. The digital image signals stored in the image memories 41, 44 are read out through the delay circuit (which may be the phase shift signal generator) 55 so that the digital image signals have a delay of a predetermined phase relative to the camera state information signal. The digital image signals are sent together with the camera state information signal through output terminals 50, 51, 54 to the recording portion 102 to be recorded in the recording medium 105. Further, the multi-eye image-taking apparatus has a main camera selection switch 25, a zoom control button 28, a convergence angle control button 53, a stereo-panorama changeover switch 35, and a viewfinder display changeover switch 57 as control buttons or switches.

The zooming and focusing systems are next described below.

The present embodiment employs a lens system of the rear focusing type, in which a focusing lens 1-a has a function as a correcting lens to correct movement of the focal plane upon a change in focal length and a function as a focusing lens. Since the correcting lens also serves as the focusing lens in the lens system of this type, a locus of movement of the correcting lens changes depending upon an object distance during zooming. Then a plurality of loci of focusing lens movement as described above are stored in the control portion 15 and the focusing lens 1-a is moved based on a locus selected according to an object distance. Further, differences between the left and right lens groups would result in a difference of the angle of view, deviation of the optical axes in zooming, and deviation of timing in focusing, which would become weak points of the multi-eye image-taking system. To overcome them, written in EEPROM 16 in production is correspondence data of positions of the left and right zoom lenses to make the angles of view thereof equal to each other and correspondence data between distances to object and positions of the left and right focusing lenses therefor.

Next described is the operation of the multi-eye image-taking apparatus employed in the system of the present embodiment.

Initialization of the apparatus is first described. With supply of power to the apparatus, the control portion 15 first sets an initial value, i.e., a horizontal view angle 30° for the zoom optical systems of the two cameras A, B, and thereafter drives the adjusting motor 22 to set a distance between the two cameras A, B to a predetermined initial value, i.e., 65 mm herein, which is a general distance (base length) between the human eyeballs. Then the two cameras A, B are driven so that they become perpendicular to a line connecting the rotation centers thereof and parallel to each other. The setting of this state is written in EEPROM 16 in production after an angle offset value is measured between the standard value of each angle detector 19, 20 and the mentioned state. Then a distance is measured with a camera selected through the main camera selection switch 25, for example with the right camera A, between the distance detector 33 of the right camera A and an object in front thereof. Then the control portion 15 checks a state of the stereo-panorama changeover switch 35, i.e., which of the stereo mode and the panorama mode is selected.

First described is a case that the stereo mode is selected.

If the stereo-panorama changeover switch 35 is in the state on the stereo side, the optical axes of the two cameras A, B are adjusted to be directed toward an intersection between the perpendicular bisector to a line connecting the rotation centers of the cameras and a plane at the measured distance. With the distance measurement result d0 and the camera gap e0, the camera angle θ0 is given as follows:

$$\theta 0 = A\ TAN\ (2 \cdot d0/e0)$$

(where A TAN represents an inverse function of TAN). Thus, the control portion 15 rotates the cameras inward to the positions for θ0. In this case, a distance df between the cameras and the intersection of the optical axes thereof is given by the following formula.

$$df = e0/(2 \times \cos \theta 0)$$

After that, the distance is again measured by the distance detector of the main camera (the distance detector 33 of the right camera A in this case). If an error of the measurement result df' with respect to the above-described, calculated result df is smaller than a predetermined value, focusing of the left and right cameras is carried out with the measurement result df'. Namely, it can be assumed that there is the same object as measured with the cameras being in the parallel state, at the intersecting position or another object near the intersecting position. Since there is little error between the distance measurement result df' and the calculation result df, the focusing should be more appropriate based on the actual distance measurement with the measurement result df'. Here, focusing for the left camera is carried out using the distance measurement result of the right camera, but there is no problem caused because of the symmetry as apparent from the drawing. Since the camera gap is 65 mm in the present embodiment, no problem would arise by the assumption that the object on the perpendicular bisector is a portion of the object right opposed to the right camera A or another object near it.

Next described is a case that the panorama mode is selected.

When the stereo-panorama changeover switch 35 is set in the panorama state, the control portion 15 moves the optical axes of the cameras A, B outward so that an amount of overlap of the left and right images becomes a predetermined rate. The cameras of the present embodiment are so arranged that the rate of overlap of the left and right images is set to ⅓ of the left and right images. In more detail, the angles of the cameras are so set that left one third of the right image overlaps with right one third of the left image, as shown in FIGS. 15, 15A and 15B. Then the left and right cameras are made in focus with the distance d0. The focusing of the left camera B is conducted using the distance measurement result by the right camera A, whereby the focus can be made uniform in the overlapping region. In the present embodiment the camera gap is 65 mm and the rate of overlap of the left and right images is ⅓. Therefore, it can be assumed that an object after the outward rotation of the cameras is the same as the object as measured with the cameras in the parallel state or another object close thereto. Then no problem would arise with the focus distance set as d0.

The operation in taking images is next described.

The operation is as follows when the stereo mode is selected.

Figure 16:
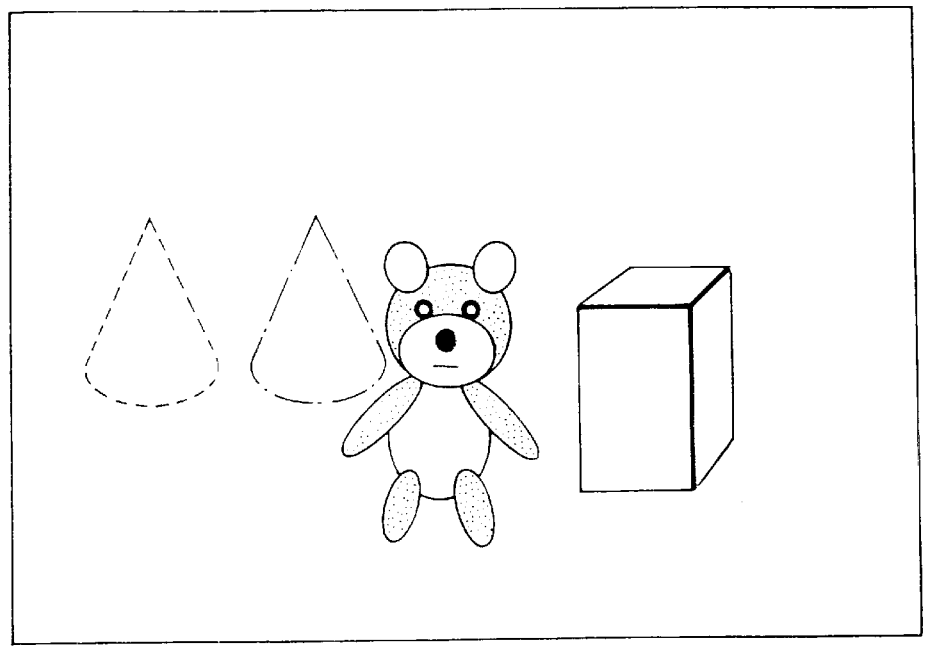
FIG. 16 is a drawing to show an example of display in a viewfinder in the stereo mode.

Since the cameras A, B are focused at the intersection between the optical axes thereof in the initialized state, the object is displayed on the screen. As described previously, if the intersection between the optical axes is located more distant from the object, the object is displayed in front of the screen; on the contrary, if the intersection between the optical axes is nearer than the object, the object is displayed behind the screen. Thus, the stereoscopic effect can be changed by changing the convergence angle to change the position of the intersection between the optical axes. The viewfinder 24 indicates an image synthesized by ordinary technology from the images of the left and right cameras. The displayed screen is one as shown in FIG. 16, in which an object at the distance of the intersection between the optical axes is displayed as left and right images thereof are superimposed on each other. An object closer to or farther from the intersection between the optical axes is displayed as left and right images thereof are shifted from each other. The larger the shift amount is, the farther the object is from the intersection between the optical axes. Since the convergence angle can be changed by driving the right convergence angle motor 17 and left convergence angle motor 18 through the convergence angle control button 53, the camera operator can adjust the convergence angle while observing the displayed screen in the viewfinder 24 so as to achieve favorite stereoscopic effect.

The operation is as follows when the panorama mode is selected.

In the initialized state the overlapping region of the left and right images is one third of the respective images. To take images in a further wider region, the overlapping region can be decreased by increasing the angle between the optical axes of the two cameras A, B. Conversely, the image-taking region can be narrowed by decreasing the angle between the optical axes of the two cameras A, B so as to increase the overlapping region. The images from the left and right cameras are displayed as switched from one to another on the viewfinder 24. Similarly as in the stereo mode, the optical axes can be adjusted through the convergence angle control button 53, so that the camera operator can take images with favorite panorama effect while monitoring the image-taking region of the left and right cameras A, B on the viewfinder 24.

A rotation angle of adjustment of convergence angle in taking images is detected by the rotation angle detectors 19, 20 for the cameras A, B, and angles of the cameras can be obtained from outputs from the detectors 19, 20 and the data in EEPROM 16.

Figure 17:
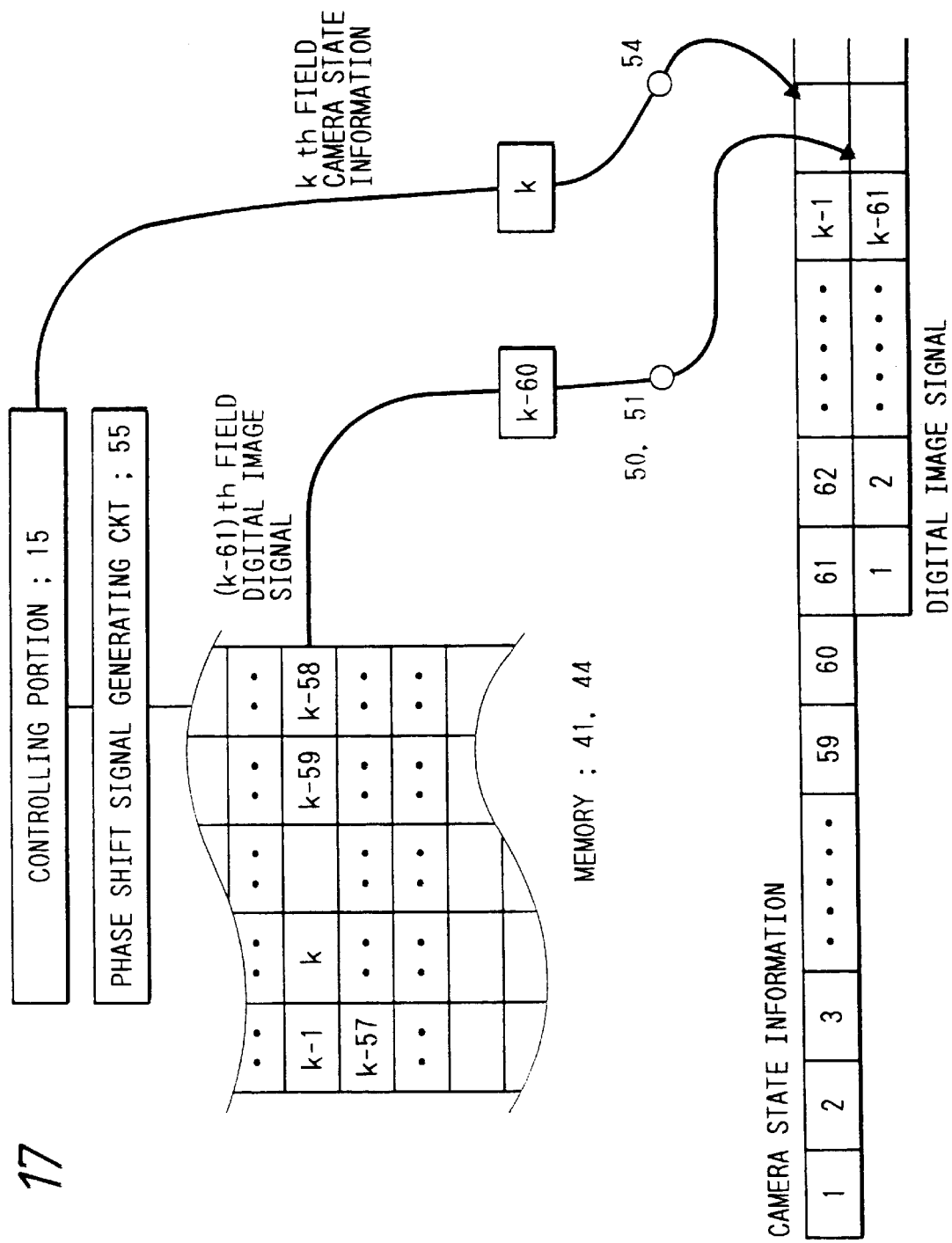
FIG. 17 is an explanatory drawing of a recording method.

Next described referring to FIG. 17 is the recording method of the multi-eye image-taking apparatus of the present embodiment.

The address signal processing portion 52 assigns the address signal to the camera state information (information about the convergence angle of cameras herein) obtained as described above and the digital image signals output from the A/D converters 40, 41 so as to synchronize them. The left and right digital image signals with the address signal are stored in the image memories 41, 44. When the camera state information signal is output from the control portion 15 to the output terminal 54, the phase shift signal generator 55 calls the image information signals a predetermined number of fields ahead of the camera state information signal from the image memories 41, 44 to output them. In the present embodiment the predetermined number of fields is determined as 60 fields. The "60 fields" corresponds to a time period sufficiently longer than a time necessary for moving the display units as described below, based on the control signal. If the moving speed of the display units is faster, the time can be made shorter. Conversely, if the moving speed of the display units is slower, the time has to be made longer. When the camera state information signal for the k-th field is output, image signals of the (k−60)-th field are called from the image memories 41, 44 to be output. While $1 \leq k \leq 60$, the image information signals are not output but only the camera state information signal is output. After the camera state information signal of the final field is output, there remains 60 fields of image information. Once the output of the camera state information signal is stopped, that the image taking is ended is judged. After the final camera state information signal and the image information signals 60 fields ahead of the final frame are output, the image information of remaining 60 fields is output using a read-out clock signal set in the control portion 15.

The image information signals, which are read out with a phase lag of 60 fields to the camera state information signal and output from the output terminals 50, 51, 54, and the camera state information signal are sent to the recording/reproducing portions 102, 103 to be recorded in the recording medium. Thus, the camera state information signal is recorded 60 fields ahead of the digital image signals. This preceding state of information is expressed as advance of information in the appended claims and in the specification. The multi-eye image-taking apparatus of the present embodiment is so arranged that the camera state information is the convergence angle information obtained from the detector 23. The thus recorded image information and camera state information is reproduced with necessity to be supplied to the displaying apparatus as described below.

Although the above description concerned the example where the image information stored in the memories was called based on the camera state information advancing by the predetermined time, the same effect can be achieved by such a simple arrangement that a delay circuit is used to delay the image information by the predetermined time relative to the camera state information. Further, the present embodiment employed the recording medium of video tape, but the recording medium may be selected from various recording media such as disk recording media, tape recording media, and IC cards. According to the above operation, the camera state information signal is recorded a sufficiently long time period, e.g., 60 fields in the present embodiment, necessary for moving the display units, based on the control signal, ahead of the digital image signals. It is noted that the preceding state of the information is expressed as advance of information in the claims and the specification.

Next described is the displaying apparatus 104 employed in the system of the present embodiment.

Figure 18:
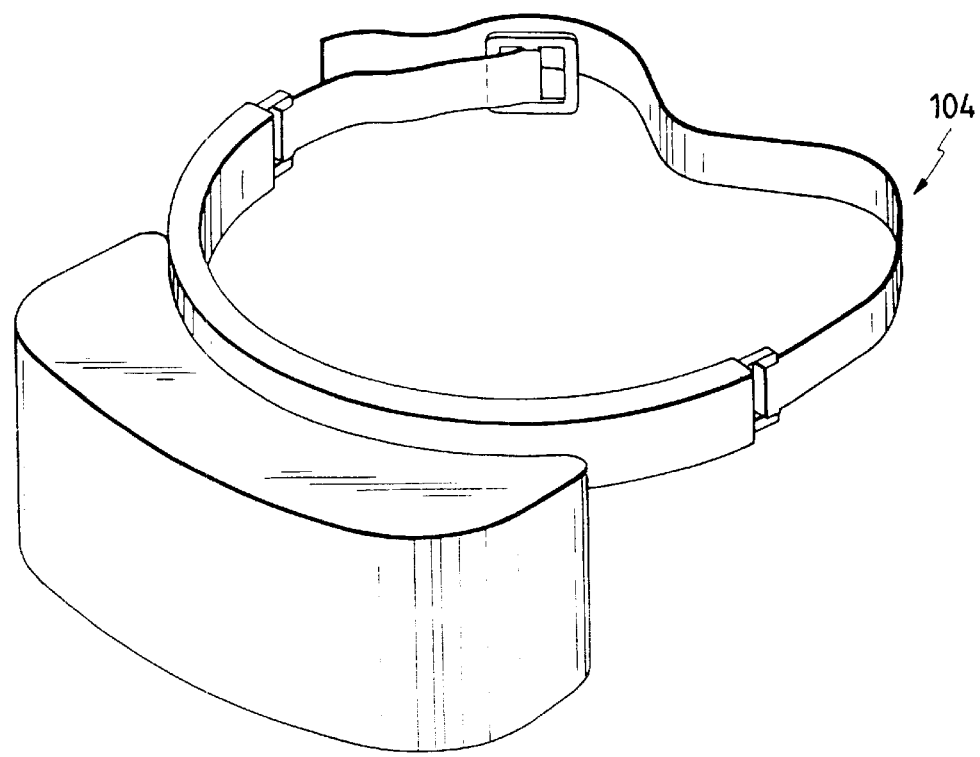
FIG. 18 is a perspective view to show the appearance of a displaying apparatus employed in the third embodiment.

FIG. 18 is a perspective view to show appearance of the displaying apparatus 104 in the present embodiment. The displaying apparatus 104 is a display like goggle used as mounted on the head, which has two compact liquid crystal display panels (LCD) to display respective images for the left eye and the right eye. The displaying apparatus uses lenses to enlarge the displayed images, whereby virtual images can be displayed as if there is a 30-inch television about 1 m before. Accordingly, the observer can enjoy as if to watch a large-screen television, using such a compact device. Each display unit is composed of a backlight, an LCD, and a lens group. The display units are so arranged that the gap can be adjusted to match with the gap (base length) between the left and right eyes of observer. Also, the left and right display units each have such structure that the angle thereof can be changed in the horizontal plane. Therefore, natural stereo images and wide-field images can be obtained by adjusting or controlling the angle of the display units in accordance with the convergence angle of the cameras in taking images.

Figure 19:
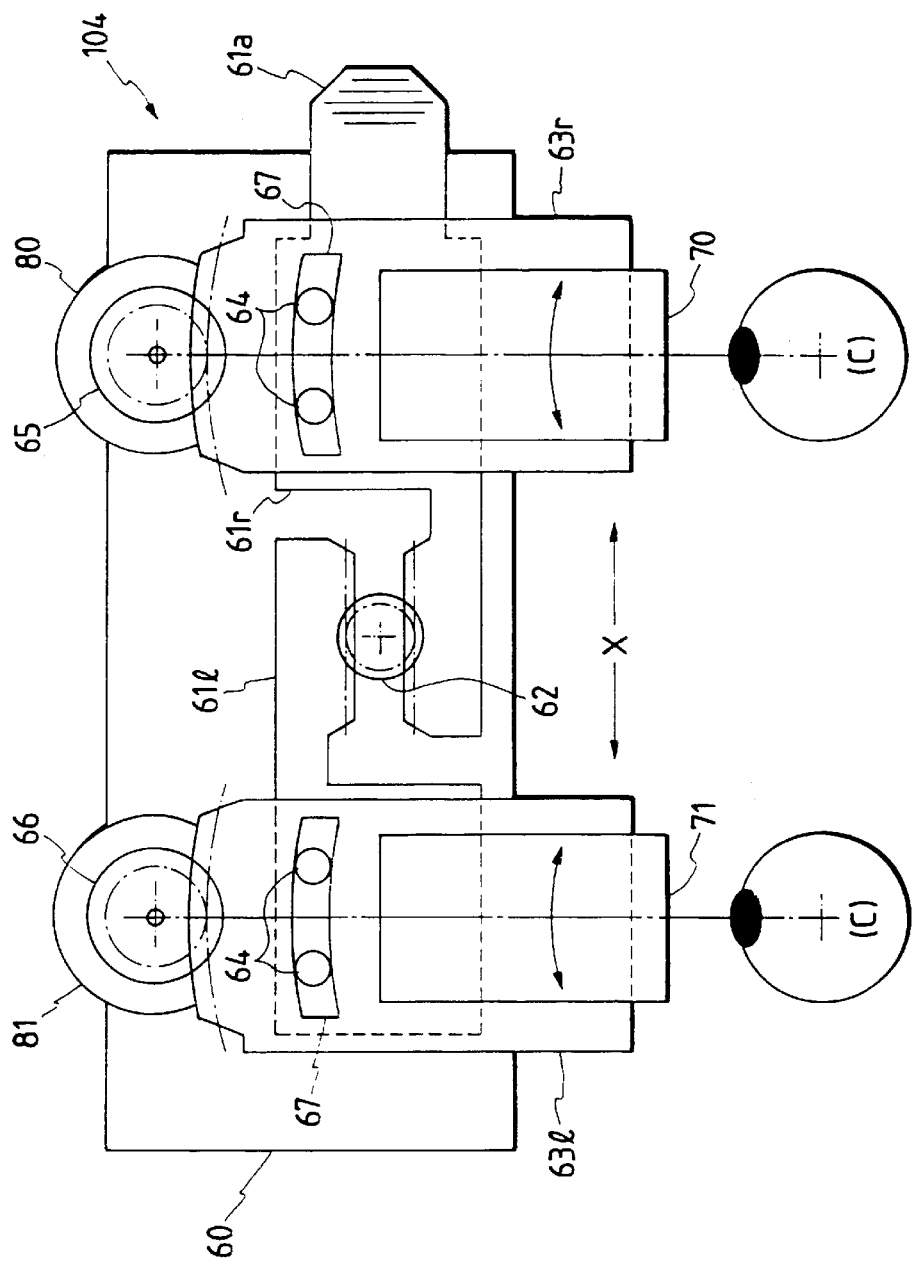
FIG. 19 is a drawing to show an operating mechanism of the displaying apparatus employed in the third embodiment.

FIG. 19 is a drawing to specifically show an operating mechanism for display units in the displaying apparatus 104 in the present embodiment. In FIG. 19, numeral 70 designates a right eye display unit and 71 a left eye display unit. Each display unit is composed of a lens group, an LCD, and a backlight as detailed later. Numeral 60 is a frame incorporated with the main body to be mounted on the head. Numeral 61 is a base-length base arranged as slidable in the X-direction in the drawing relative to the frame 60. The left or right base-length base 61*l* or 61*r* is provided with a linear rack, which is in mesh with a gear 62 rotatably supported on the frame 60. The right base-length base 61*r* is provided with a knob 61*a*. When the observer pinches the knob 61*a* to move the right base-length base 61*r* along the x-direction in the drawing so as to match the gap with the base length of the observer, the left base-length base 61*l* also moves in the opposite direction by the same amount as the right base-length base 61*r* does.

Numeral 63 denotes a convergence base rotatably supported on the base-length base 61*l* or 61*r*. Each of the left and right convergence bases 63*l*, 63*r* has a rotation guide groove 67 in an arc shape with the center at the pupil center (C) of eyeball located at the eye point on the lens design. The rotation guide groove is engaged with two pins 64 standing on each base-length base so that the convergence base can rotate about the center (C). Further, each of the left and right convergence bases 63*l*, 63*r* is provided with a rack in an arc shape with the center at the above center (C), which is in mesh with a gear 65 or 66 mounted on a motor 80 or 81 for rotating to change the convergence angle. The left and right convergence bases 63*l*, 63*r* hold the left and right eye display units 71, 70 so that the left and right optical axes are directed to the left and right centers (C), respectively. Thus, the mechanism is so arranged that the convergence angle can be adjusted or controlled by controlling movement of the motors 80, 81.

Figure 20:
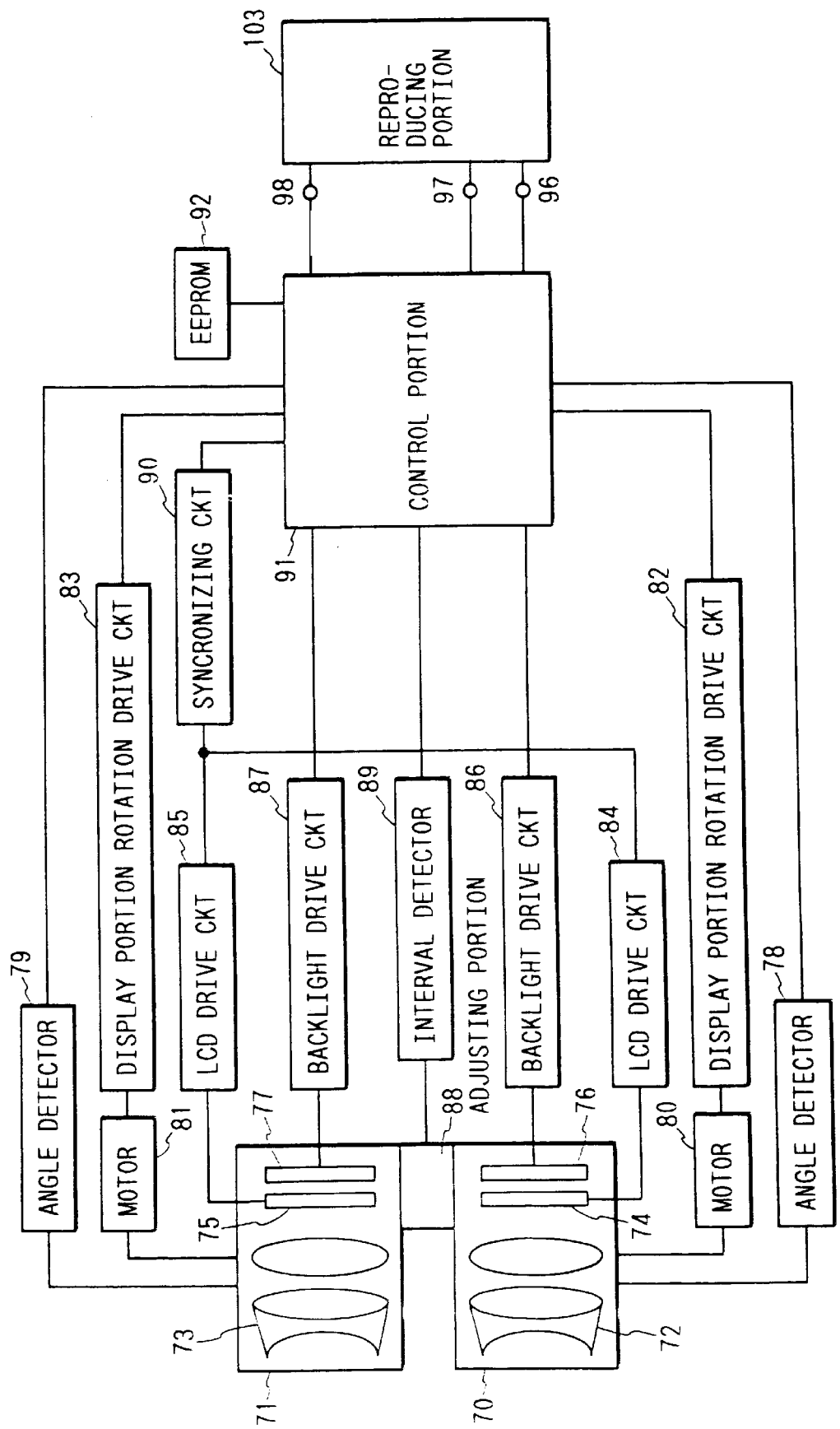
FIG. 20 is a drawing to show the structure of the displaying apparatus employed in the third embodiment.

The structure of the displaying apparatus 104 is next described in more detail with reference to the block diagram shown in FIG. 20.

The signals having been image-taken and then recorded by the previously described multi-eye image-taking apparatus are reproduced by the reproducing portion 103 to be put through input terminals 96, 97 for image signals and an input terminal 98 for camera state information signal into the displaying apparatus main body portion. There are two display units, i.e., a right eye display unit 70 and a left eye display unit 71, each of which is composed of a lens group 72, 73, an LCD 74, 75, and a backlight 76, 77. Each display unit 70, 71 is driven by a synchronizing circuit 90, an LCD drive circuit 84, 85, and a backlight drive circuit 86, 87. The two display units 70, 71 are adjusted so as to match the gap between them with the base length of the observer through a gap adjusting portion 88, and a gap detector 89 obtains a value of the gap to supply it to a control portion 91. Also, the display units 70, 71 each are arranged to be rotated in the horizontal plane about the pupil center of the eyeball located at the eye point on the lens design, and can be rotated by the motors 80, 81 driven by the rotation drive circuits 82, 83. An angle of each display unit 70, 71 is detected by an angle detector 78 or 79 to be supplied to the control portion 91. Further, numeral 92 is an EEPROM in which variations of LCDs, individual differences between the left and right lens groups, initial values of angles and gap of the two display units 70, 71, etc. have been recorded in production.

The multi-eye image-taking apparatus/displaying apparatus of the present embodiment is arranged to record and/or reproduce the convergence angle information as the camera state information in taking images together with the image information. Thus, the angles of the display units 70, 71 can be drive-controlled corresponding to the images in reproduction, so that the observer can view the display units 70, 71 with the same convergence angle as the convergence angle of the cameras in taking images. Since the convergence angle information is recorded 60 fields ahead of the image signals, the convergence angle information is naturally reproduced 60 fields ahead of the image signals in reproduction when the reproducing portion 103 reproduces the signals having been image-taken and then recorded by the aforementioned multi-eye image-taking apparatus. Since the convergence angle information is reproduced 60 fields ahead of the image information, the control portion 91 can make a judgment as to what angles the display units 70, 71 have to take after 60 fields, what angles they take now, and what motions they have to take during the period, enabling to execute a control without a mechanical delay. Thus, the display units 70, 71 can be actuated to rotate without a delay to the images, thus achieving natural images.

The fourth embodiment of the present invention is next described referring to the drawings.

The previous, third embodiment is so arranged that the camera state information is recorded ahead of the image information whereby the display unit control information is reproduced prior to the image information in reproduction, while the present embodiment is so arranged that the camera state information and the image information is approximately simultaneously recorded, the image information is once stored in memories in reproduction, and the image information is read out with a delay of a predetermined time relative to the camera state information signal, whereby the camera state information signal can go ahead of the image information.

Figure 21:
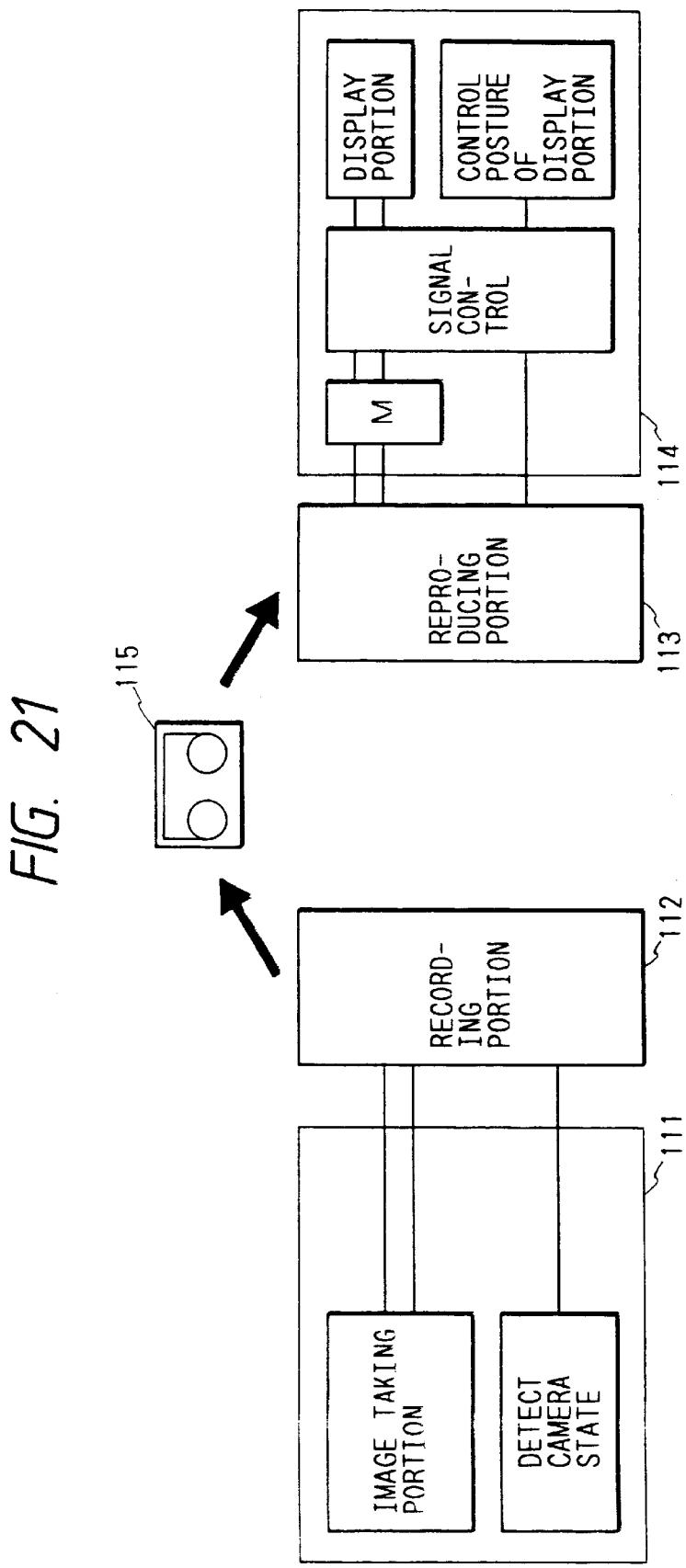
FIG. 21 is a drawing to show the structure of a system of the fourth embodiment.

FIG. 21 is a block diagram to show the structure of a multi-eye image-taking and/or displaying system of the present embodiment.

In FIG. 21, numeral 111 designates a multi-eye image-taking apparatus, 112 a recording portion, 113 a reproducing portion, 114 a displaying apparatus, and 115 a recording medium. The multi-eye image-taking apparatus 111 is provided with detecting means for detecting the camera state such as the convergence angle in taking images, which outputs the detection results as camera state information. Image signals image-taken by the multi-eye image-taking apparatus 111 are recorded in the video tape 115 by the recording portion 112 together with signals of the camera state information. The signals recorded in the video tape are reproduced by the reproducing portion 113 to be supplied to the displaying apparatus 114. The camera state signal is reproduced a predetermined phase ahead of the image signals by means as described below, so that the preceding camera state information is used to judge how to adjust the posture of the display units in correspondence with the images, permitting the posture of the display units to be adjusted without a time lag with respect to the images.

The constituents will be described one by one.

The multi-eye image-taking apparatus 111 is first described.

Figure 22B:
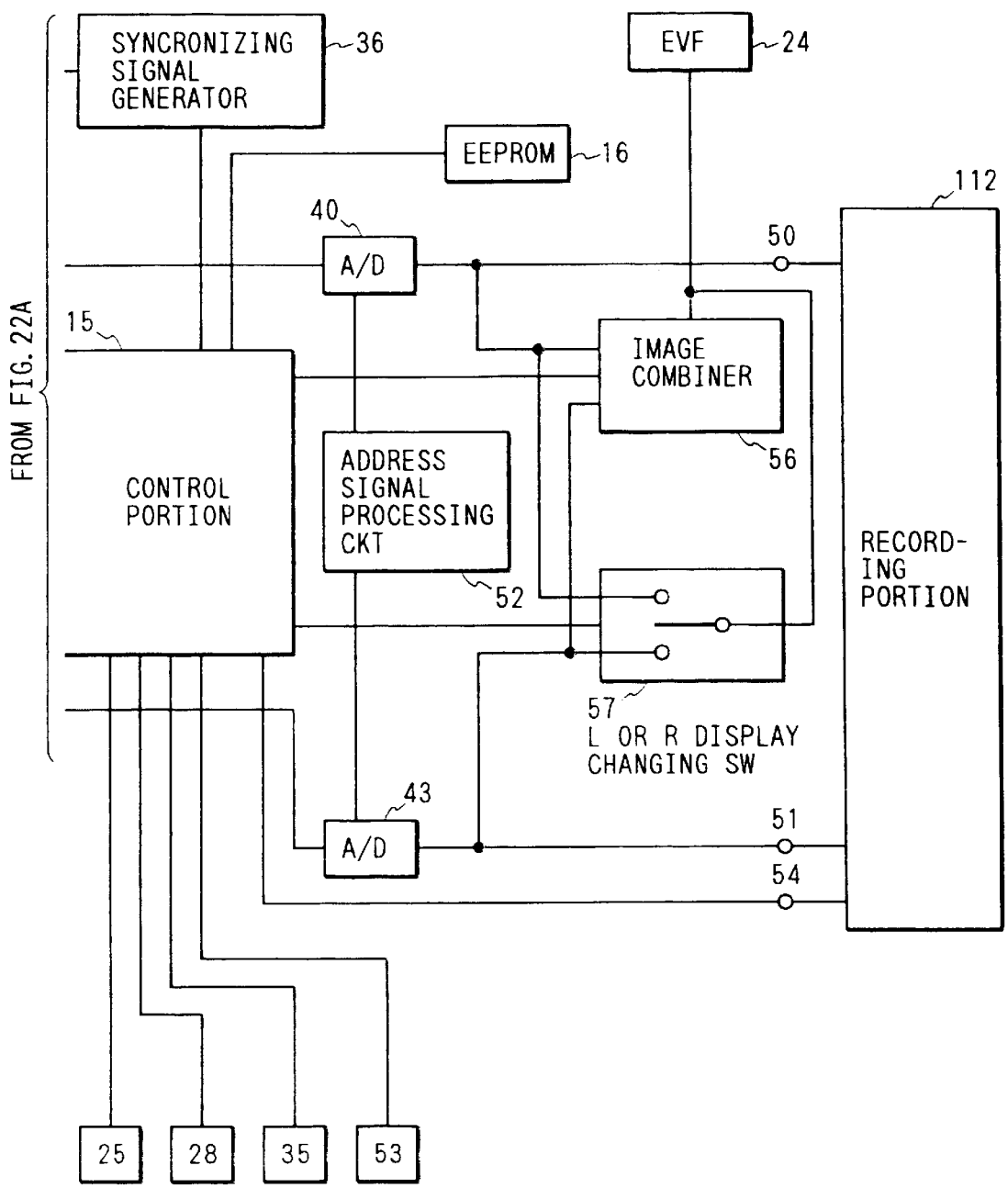
FIG. 22 is comprised of FIGS. 22A and 22B showing drawings of the structure of a multi-eye image-taking apparatus employed in the fourth embodiment.

A perspective view of appearance of the multi-eye image-taking apparatus 111 of the present embodiment is the same as FIG. 12. Since the multi-eye image-taking apparatus 111 in the present embodiment is substantially the same in structure as the multi-eye image-taking apparatus in the third embodiment, only differences between them will be described herein and other description will be omitted. FIGS. 22A and 22B are block diagrams to show the structure of the multi-eye image-taking apparatus 111 in the present embodiment, which corresponds to FIGS. 13A and 13B in the third embodiment. The multi-eye image-taking apparatus 111 in the present embodiment excludes the memories for storing the image information and the delay circuit, in which left and right digital image signals output from the A/D converters 40, 43 are sent together with the camera state information signal through the respective output terminals 50, 51, 54 to the recording portion 112 to be recorded in the recording medium 115. On this occasion the image information signals and the camera state information signal are equal in phase to each other, so that the image information signals and the camera state information signal at a same moment are approximately simultaneously recorded.

Next described is the displaying apparatus 114 employed in the system of the present embodiment.

Figure 23:
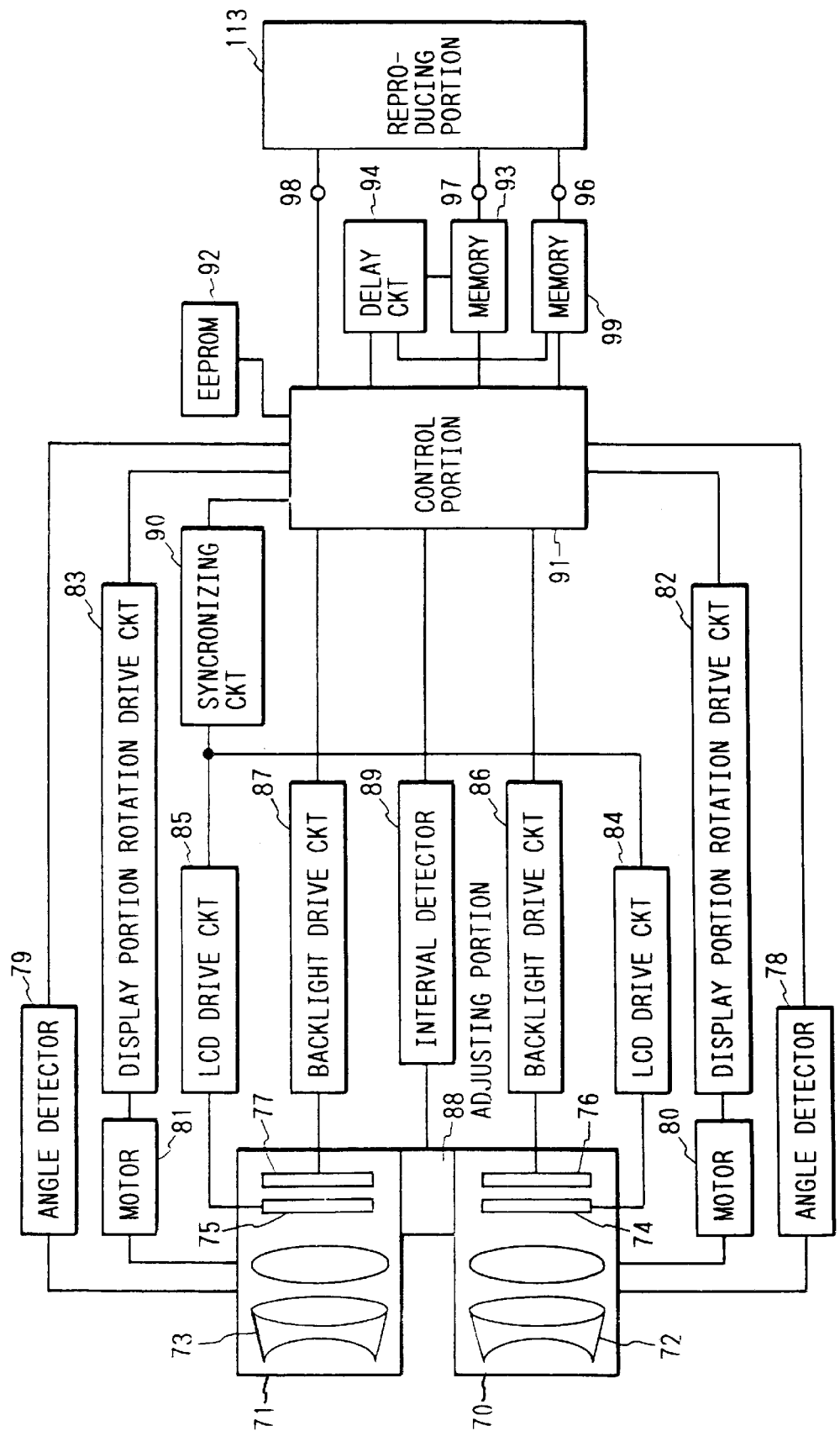
FIG. 23 is a drawing to show the structure of a displaying apparatus employed in the fourth embodiment.

The appearance and operating mechanism of the displaying apparatus 114 employed in the present embodiment are the same as those in the third embodiment. Also, the structure of the displaying apparatus 114 in the present embodiment is similar to that of the displaying apparatus 104 in the third embodiment, and, therefore, only differences will be described omitting the other description. FIG. 23 is a block diagram to show the structure of the displaying apparatus 114 in the present embodiment, which corresponds to FIG. 20 in the third embodiment. The signals having been image-taken and recorded by the previously described multi-eye image-taking apparatus 111 are reproduced by the reproducing portion 113 to be put through image signal input terminals 96, 97 and camera state information signal input terminal 98 into the displaying apparatus main body 114. The image signals are put into memories 93, 99, while the camera state information signal is put into a control portion 91. The image signals are called from the memories 93, 99 by a delay circuit 94 for delaying a signal by a predetermined time to be supplied to the control portion 91. The predetermined time herein means a time period sufficiently longer than a time necessary for moving the display units based on the control signal, which is set as 60 fields in the present embodiment similarly as in the third embodiment. The length of 60 fields can be reduced if the moving speed of the display units is faster, or should be extended if the moving speed of the display units is slower. Thus, the period is not limited to the specific numerical value of 60 fields. The multi-eye image-taking apparatus/displaying apparatus of the present embodiment is so arranged that the convergence angle information as the camera state information in taking images is recorded and/or reproduced together with the image information. Accordingly, the angles of the display units can be drive-controlled in correspondence with the images in reproduction, so that the observer can view the display units with the same convergence angle as the convergence angle of cameras in taking images. As described above, the image information is put into the control portion 91 60 fields behind the convergence angle information. Since the convergence angle information is put into the control portion 91 60 fields ahead of the image information, the control portion 91 can make a judgment as to what angles the display units have to take after 60 fields, what angles they are taking at present, and what motion they have to take during the period, enabling to execute a control with as little mechanical delay as possible. Thus, the display units can be actuated to rotate without a delay to the images, thus obtaining natural images.

The fifth embodiment will be described referring to the drawings.

The present embodiment is so arranged that the camera state information and the image information is substantially simultaneously recorded, there are two heads provided as a control head for reproducing the camera state information signal and an image head for reproducing the image information signals, and the camera state information signal is reproduced by a reproducing portion in which the control head is disposed ahead of the image head, whereby the camera state information signal is reproduced ahead of the image information.

Figure 24:
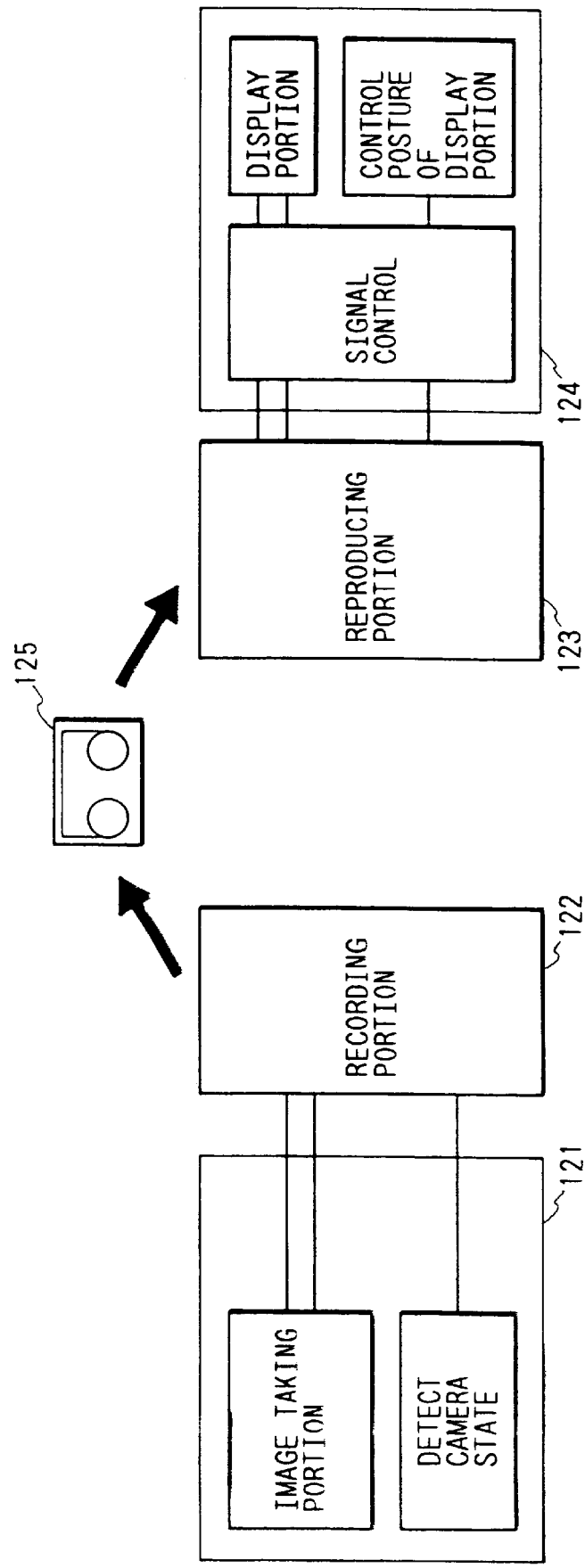
FIG. 24 is a drawing to show the structure of a system of the fifth embodiment.

FIG. 24 is a block diagram to show the structure of a multi-eye image-taking and/or displaying system of the present embodiment.

In FIG. 24, numeral 121 is a multi-eye image-taking apparatus, 122 a recording portion, 123 a reproducing portion, 124 a displaying apparatus, and 125 a recording medium. The multi-eye image-taking apparatus 121 is provided with detecting means for detecting the camera state such as the convergence angle in taking images, which outputs the detection results as camera state information. Signals of images taken by the multi-eye image-taking apparatus 121 are recorded together with the camera state information signal in the video tape 125 by the recording portion 122. The signals recorded in the video tape 125 are reproduced by the reproducing portion 123 to be supplied to the displaying apparatus 124. In the present embodiment, the camera state signal is reproduced a predetermined phase ahead of the image signals and the preceding camera state information is used to determine how to adjust the posture of the display units in correspondence with the images, whereby the posture of the display units can be adjusted without a time lag relative to the images.

The constituents will be described one by one.

First, as for the multi-eye image-taking apparatus 121 of the present embodiment, the structure thereof is the same as the multi-eye image-taking apparatus 111 employed in the fourth embodiment and, therefore, the description is omitted herein.

The displaying apparatus 124 of the present embodiment is next described.

The appearance and operating mechanism of the displaying apparatus 124 in the present embodiment are the same as those in the third embodiment (as shown in FIG. 18 and FIG. 19).

Figure 25:
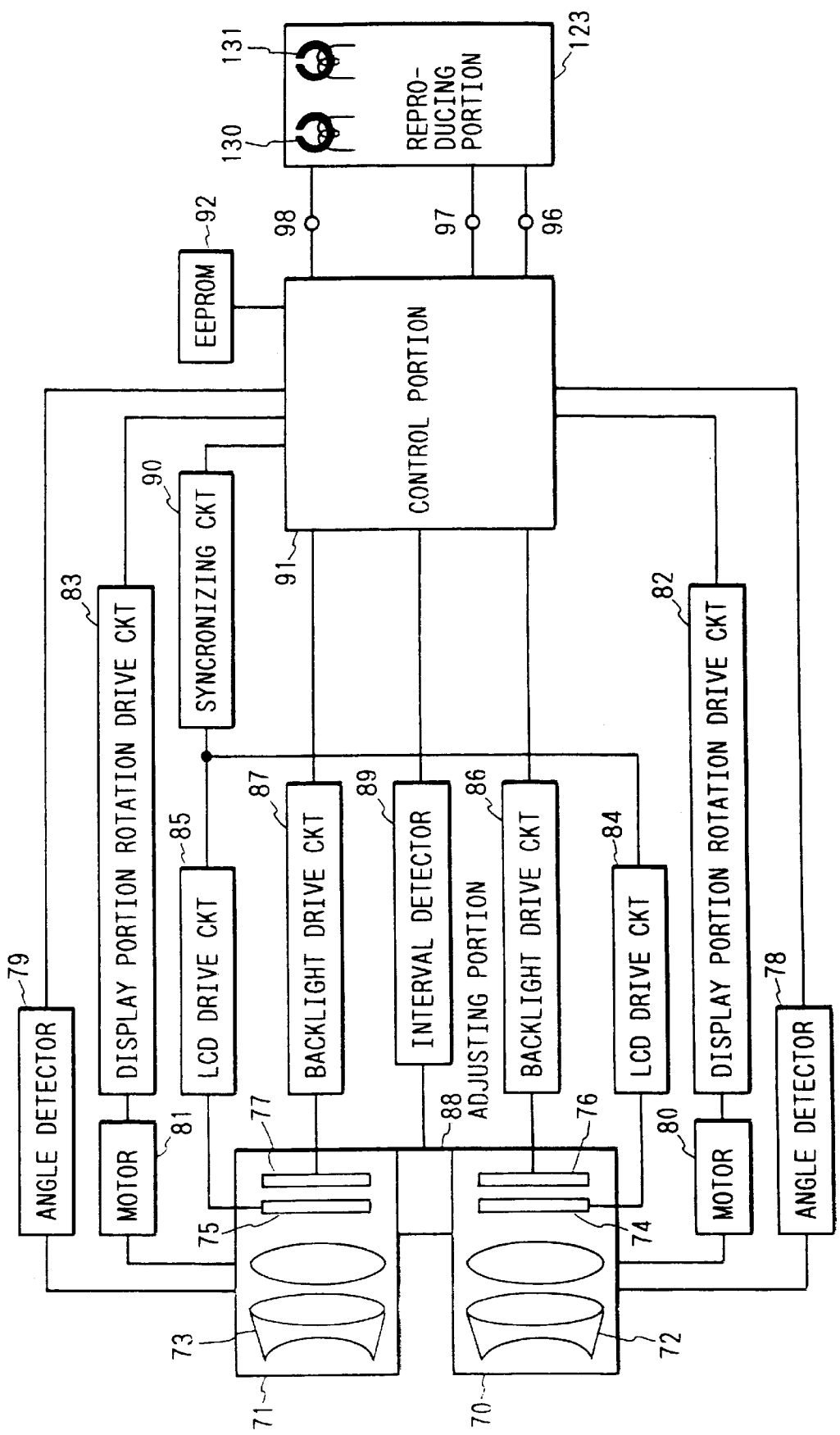
FIG. 25 is a drawing to show the structure of a displaying apparatus employed in the fifth embodiment.

The displaying apparatus 124 in the present embodiment is similar in structure to the displaying apparatus 104 in the third embodiment, and, therefore, only differences are described herein omitting the other description. FIG. 25 is a block diagram to show the structure of the displaying apparatus 124 in the present embodiment, which corresponds to FIG. 20 in the third embodiment. Signals having been image-taken and recorded by the previously described multi-eye image-taking apparatus 121 are reproduced by the reproducing portion 123. The reproducing portion 123 has two heads which are a control head 130 for reproducing the camera state information signal and an image head 131 for reproducing the image signals, and the control head 130 is disposed ahead of the image head 131 in the tape running direction. The camera state information is reproduced ahead of the image information accordingly. The time for advance can be determined by a gap between the control head and the image head, and a running speed of the tape. Since the running speed of tape is generally determined by the recording format, the distance between the heads can be determined depending upon moving capability of the displaying apparatus. The present embodiment is also arranged so that the convergence angle information is recorded and/or reproduced as the camera state information in taking images together with the image information. Thus, the angles of the display units can be drive-controlled in correspondence with the images in reproduction, so that the observe can view the display units with the same convergence angle as the convergence angle of the cameras in taking images. As described above, the control head and image head are arranged to reproduce the control signal ahead of the image signals, which enables to control the movement of the display units with little delay with respect to the images. Thus, the display units can be actuated to rotate without a delay to the images, obtaining natural images.

Although the above embodiments are so arranged that the recording portion and the reproducing portion are attached to the multi-eye image-taking apparatus and the displaying apparatus, respectively, the present invention is by no means limited to the arrangement.

For example, the present invention involves the following modifications: the recording portion and reproducing portion both are built in the multi-eye image-taking apparatus; the recording portion is built in the multi-eye image-taking apparatus while the reproducing portion in the displaying apparatus; the recording portion and reproducing portion are incorporated with each other to form a recording-reproducing apparatus completely separate from the multi-eye image-taking apparatus and the displaying apparatus.

The third and fourth embodiments are so arranged that only the image information is written in the memories, but the present invention is by no means limited to the arrangement. For example, another possible arrangement is such that the camera state information as well as the image information is written in the memories and read out at different timings to make the camera state information ahead of the image information.

The third and fourth embodiments are provided with the recording portion and reproducing portion whereby the camera state information and image information is transmitted through the recording medium from the multi-eye image-taking apparatus to the displaying apparatus, but the invention is by no means limited to it. For example, a possible arrangement is such that the camera state information and image information is directly transmitted from the multi-eye image-taking apparatus to the displaying apparatus.

What is claimed is:

1. An image display system comprising:

image taking means for producing a plurality of image signals corresponding to a plurality of optical images from different view points;

control signal outputting means for outputting control signals indicating controlled states of said image taking means while said image taking means is taking said optical images, in order to produce said image signals;

display image signal generating means for generating a first display image signal and a second display image signal based on said image signals;

display means for enabling an observer to observe an enlarged virtual image of a first display image based on said first display image signal with one of the eyes of said observer and enabling said observer to observe an enlarged virtual image of a second display image based on said second display image signal with the other one of the eyes of said observer, wherein said display means have a first display device for displaying said first display image based on said first display image signal, a second display device for displaying said second display image based on said second display image signal, a first optical system for enabling said observer to observe said enlarged virtual image of said first display image displayed in said first display device with said one of the eyes of said observer and a second optical system for enabling said observer to observe said enlarged virtual image of said second display image displayed in said second display device with said other one of the eyes of said observer; and controlling means for controlling a displaying state of said display means based on said control signals outputted from said control signal outputting means, while said display means is enabling said observer to observe said enlarged virtual image of said first display image with said one of the eyes of said observer and said enlarged virtual image of said second display image with said other one of the eyes of said observer, wherein said controlling means change a spatially relative position between said enlarged virtual image of said first display image and said enlarged virtual image of said second display image on the basis of said control signals in order to change a convergence angle between an optical axis of an eye of said observer observing said enlarged virtual image of said first display image and an optical axis of the other eye of said observer observing said enlarged virtual image of said second display.

2. An apparatus according to claim 1, wherein said controlling means change a spatially relative position between said enlarged virtual image of said first display image and said enlarged virtual image of said second display image by controlling positions of said first and second optical systems with respect to said first and second display devices or image formation states of said first and second optical systems.

3. An apparatus according to claim 1, wherein said controlling means change said spatially relative position between said enlarged virtual image of said first display image and said enlarged virtual image of said second display image, from a state where both of said enlarged virtual images are overlapped to a state where said both of the enlarged virtual images are neighboring in parallel.

4. An apparatus according to claim 1,
wherein said control signal outputting means output information indicating that said image taking means lie in a state where an image signal for displaying a two-dimensional wide image in said display means is produced or in a state where an image signal for displaying a three-dimensional stereo image in said display means is produced, as said control signal.

5. An apparatus according to claim 1,
wherein said image taking means have a plurality of image taking optical systems in order to obtain an optical image from each of different view points and said control signal outputting means output information indicating a convergence angle between said image taking optical systems, as said control signal.

6. An apparatus according to claim 1, further comprising image signal recording means for recording said image signal produced by said image taking means into a recording medium,
wherein said image signal recording means further record said control signals outputted from said control signal outputting means into said recording medium,
said display image signal generating means produce said first and second display image signals based on said image signal reproduced from said recording medium,
said controlling means control a display state of said display means based on said control signal reproduced from said recording medium, when said display means enable said observer to observe said enlarged virtual image of said first display image based on said first display image signal with one of the eyes of said observer and enable said observer to observe said enlarged virtual image of said second display image based on said second display image signal with the other one of the eyes of said observer.

7. An apparatus according to claim 6,
wherein said controlling means control positions of said first and second optical systems with respect to said first and second display devices or image formation states of said first and second optical systems to change a spatially relative position between said enlarged virtual image of said first display image and said enlarged virtual image of said second display image.

8. An apparatus according to claim 6,
wherein said controlling means change said spatially relative position between said enlarged virtual image of said first display image and said enlarged virtual image of said second display image from a state where both of the enlarged virtual images are overlapped to a state where said both of the enlarged virtual images are neighboring in parallel.

9. An apparatus according to claim 6,
wherein said control signal outputting means output information for indicating that said image taking means lie in a state where an image signal for displaying a two-dimensional wide image in said display means is produced or in a state where an image signal for displaying a three-dimensional stereo image in said display means is produced, as said control signal.

10. An apparatus according to claim 6,
wherein said image taking means have a plurality of image taking optical systems in order to obtain an optical image from each of different view points and said control signal outputting means output information indicating a convergence angle between said image taking optical systems, as said control signal.

11. An image display system comprising:
multi-eye image taking means having a plurality of video cameras;
display image signal producing means for producing a first display image signal and a second display image signal based on image signals from said multi-eye image taking means;
state detecting means for detecting a signal indicating a state of said multi-eye image taking means when taking an image is performed by said multi-eye image taking means;
displaying means for enabling an observer to observe an enlarged virtual image of a first display image based on said first display image signal with one of the eyes of said observer and enabling said observer to observe an enlarged virtual image of a second display image based on said second display image signal with the other one of the eyes of said observer;
controlling means for controlling displaying states of said display means based on said signal indicating said state outputted from said state detecting means, while said display means is enabling said observer to observe said enlarged virtual image of said first display image with said one of the eyes of said observer and said enlarged virtual image of said second display image with said other one of the eyes of said observer and;
wherein said controlling means change a spatially relative position between said enlarged virtual image of said first display image and said enlarged virtual image of said second display on the basis of said detected signal indicating said state in order to change a convergence angle between an optical axis of an eye of said observer observing said enlarged virtual image of said first display image and an optical axis of the other eye of said observer observing said enlarged virtual image of said second display.

12. An apparatus according to claim 11, further comprising adjusting means for supplying said display means with said signal indicating said state at a time before the time when said image signal is obtained.

13. An apparatus according to claim 12,
wherein said signal indicating said state indicates convergence angle information of said multi-eye image taking means.

14. An image display system comprising;
multi-eye image taking means having a plurality of video cameras;
display image signal producing means for producing a first display image signal and a second display image signal based on image signals from said multi-eye image taking means;
state detecting means for detecting a signal indicating a state of said multi-eye image taking means when taking an image is performed by said multi-eye image taking means;
displaying means for enabling an observer to observe an enlarged virtual image of a first display image based on said first display image signal with one of the eyes of said observer and enabling said observer to observe an enlarged virtual image of a second display image based on said second display image signal with the other one of the eyes of said observer;

controlling means for controlling displaying states of said display means based on said signal indicating said state outputted from said state detecting means, while said display means is enabling said observer to observe said enlarged virtual image of said first display image with said one of the eyes of said observer and said enlarged virtual image of said second display image with said other one of the eyes of said observer; and adjusting means for supplying said display means with said signal indicating said state at a time before the time when said image signal is obtained, wherein said adjusting means have a memory for memorizing at least one of said image signals and said signal indicating said state, whereby a phase of said signal indicating said state is advanced ahead of a phase of said image signal by timing when memorized signals are read out.

15. An image display system comprising:

multi-eye image taking means having a plurality of video cameras;

display image signal producing means for producing a first display image signal and a second display image signal based on image signals from said multi-eye image taking means;

state detecting means for detecting a signal indicating a state of said multi-eye image taking means when taking an image is performed by said multi-eye image taking means;

displaying means for enabling an observer to observe an enlarged virtual image of a first display image based on said first display image signal with one of the eyes of said observer and enabling said observer to observe an enlarged virtual image of a second display image based on said second display image signal with the other one of the eyes of said observer;

controlling means for controlling displaying states of said display means based on said signal indicating said state outputted from said state detecting means, while said display means is enabling said observer to observe said enlarged virtual image of said first display image with said one of the eyes of said observer and said enlarged virtual image of said second display image with said other one of the eyes of said observer;

adjusting means for supplying said display means with said signal indicating said state at a time before the time when said image signal is obtained; and a plurality of reproducing heads for reproducing said image signal and said signal indicating said state recorded into a recording medium, whereby a phase of said signal indicating said state is advanced ahead of a phase of said image signal according to the arrangement of said plurality of reproducing heads.

16. A multi-eye image taking apparatus for taking an image displayed in a display comprising:

a plurality of video cameras;

convergence angle adjusting means for adjusting convergence angle between said video cameras;

convergence angle detecting means for detecting said convergence angle between said video cameras adjusted by said convergence angle adjusting means to output convergence angle detection information; and adjusting means for advancing said convergence angle information ahead of said image information so that said convergence angle information obtained at a time before the time when said image information is obtained is supplied to said display means when a first display image information and a second display image information are produced based on each image information from said video cameras to display a first display image based on said first display image information and a second display image based on said second display image information in said display, wherein said apparatus changes over a stereo image taking mode and a panorama image taking mode and initial values of said convergence angle adjusting means are set according to said changing over said stereo image taking mode and said panorama image taking mode.

* * * * *

UNITED STATES PATENT AND TRADEMARK OFFICE
CERTIFICATE OF CORRECTION

PATENT NO.    : 6,507,359 B1
DATED         : January 14, 2003
INVENTOR(S)   : Tomotaka Muramoto et al.

It is certified that error appears in the above-identified patent and that said Letters Patent is hereby corrected as shown below:

<u>Title page, Item [54] and Column 1, line 1,</u>
"IMAGE DISPLAY SYSTEM" should read -- STEREOSCOPIC DISPLAY SYSTEM --

<u>Column 10,</u>
Line 57, "where $\omega((\omega>0))$" should read -- where $\omega$ $(\omega>0)$ --
Line 59, "$O_L O_R$" should read -- $O_L O_R$, --
Line 64, "$\theta=20.97°$," should read -- $\theta = -20.97°$, --

<u>Column 17,</u>
Line 51, "61/ or 61*r*." should read -- 61l or 61r. --
Lines 52, 58 and 62, "63/, or 63*r*" should read -- 63l, 63r --

Signed and Sealed this

Sixteenth Day of September, 2003

JAMES E. ROGAN
*Director of the United States Patent and Trademark Office*